(12) United States Patent
Iseki et al.

(10) Patent No.: US 11,746,014 B2
(45) Date of Patent: Sep. 5, 2023

(54) METHOD FOR PRODUCING SULFIDE SOLID ELECTROLYTE

(71) Applicant: IDEMITSU KOSAN CO., LTD., Tokyo (JP)

(72) Inventors: Yusuke Iseki, Chiba (JP); Nobuhito Nakaya, Ichihara (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 0 days.

(21) Appl. No.: 17/414,451

(22) PCT Filed: Nov. 20, 2020

(86) PCT No.: PCT/JP2020/043507
§ 371 (c)(1),
(2) Date: Jun. 16, 2021

(87) PCT Pub. No.: WO2021/100874
PCT Pub. Date: May 27, 2021

(65) Prior Publication Data
US 2022/0041444 A1 Feb. 10, 2022

(30) Foreign Application Priority Data

Nov. 21, 2019 (JP) .................. 2019-210567

(51) Int. Cl.
*H01M 10/0525* (2010.01)
*H01M 10/0562* (2010.01)
(Continued)

(52) U.S. Cl.
CPC .............. *C01B 17/20* (2013.01); *H01B 1/10* (2013.01); *H01M 10/0525* (2013.01);
(Continued)

(58) Field of Classification Search
CPC ......... H01M 10/0562; H01M 10/0525; H01M 2300/0068
See application file for complete search history.

(56) References Cited

U.S. PATENT DOCUMENTS

2015/0171464 A1* 6/2015 Kambara ................ H01B 1/06
429/304
2018/0155198 A1* 6/2018 Sato ................... H01M 10/0562
2019/0348708 A1* 11/2019 Iwasaki ................... C01B 17/22

FOREIGN PATENT DOCUMENTS

JP 2005100966 A 4/2005
JP 2009143975 A 7/2009
(Continued)

OTHER PUBLICATIONS

"Synthesis of sulfide-based solid electrolyte using liquid phase method and interface formation of bulk type all-solid-state battery", J. Jpn. Soc. Colour Mater., 89[9], 2016, pp. 300-304.
(Continued)

*Primary Examiner* — Osei K Amponsah
(74) *Attorney, Agent, or Firm* — Element IP, PLC

(57) ABSTRACT

Disclosed is a method for producing a sulfide solid electrolyte including a step of processing a slurry by at least one treatment selected from drying and heating, wherein a solid electrolyte raw material containing a lithium element, a sulfur element, a phosphorus element and a halogen element, and a complexing agent are mixed in a reactor to give a complex slurry containing a complex formed of the solid electrolyte raw material and the complexing agent, and the complex slurry is transferred into an intermediate tank equipped with a cooling device and cooled therein.

16 Claims, 4 Drawing Sheets

(51) Int. Cl.
*C01B 17/20* (2006.01)
*H01B 1/10* (2006.01)

(52) U.S. Cl.
CPC ..... *H01M 10/0562* (2013.01); *C01P 2006/40* (2013.01); *H01M 2300/0068* (2013.01)

(56) References Cited

FOREIGN PATENT DOCUMENTS

| | | | | |
|---|---|---|---|---|
| JP | 2014-212065 A | * | 11/2014 | ........ H01M 10/0562 |
| JP | 2015526884 A | | 9/2015 | |
| JP | 2016134316 A | | 7/2016 | |
| JP | 2019057400 A | | 4/2019 | |
| WO | WO-2018054709 A1 | | 3/2018 | |
| WO | WO-2018193994 A1 | | 10/2018 | |

OTHER PUBLICATIONS

International Search Report dated Jan. 26, 2021 in PCT/JP2020/043507 (with English translation), 5 pages.

* cited by examiner

[Fig. 1]
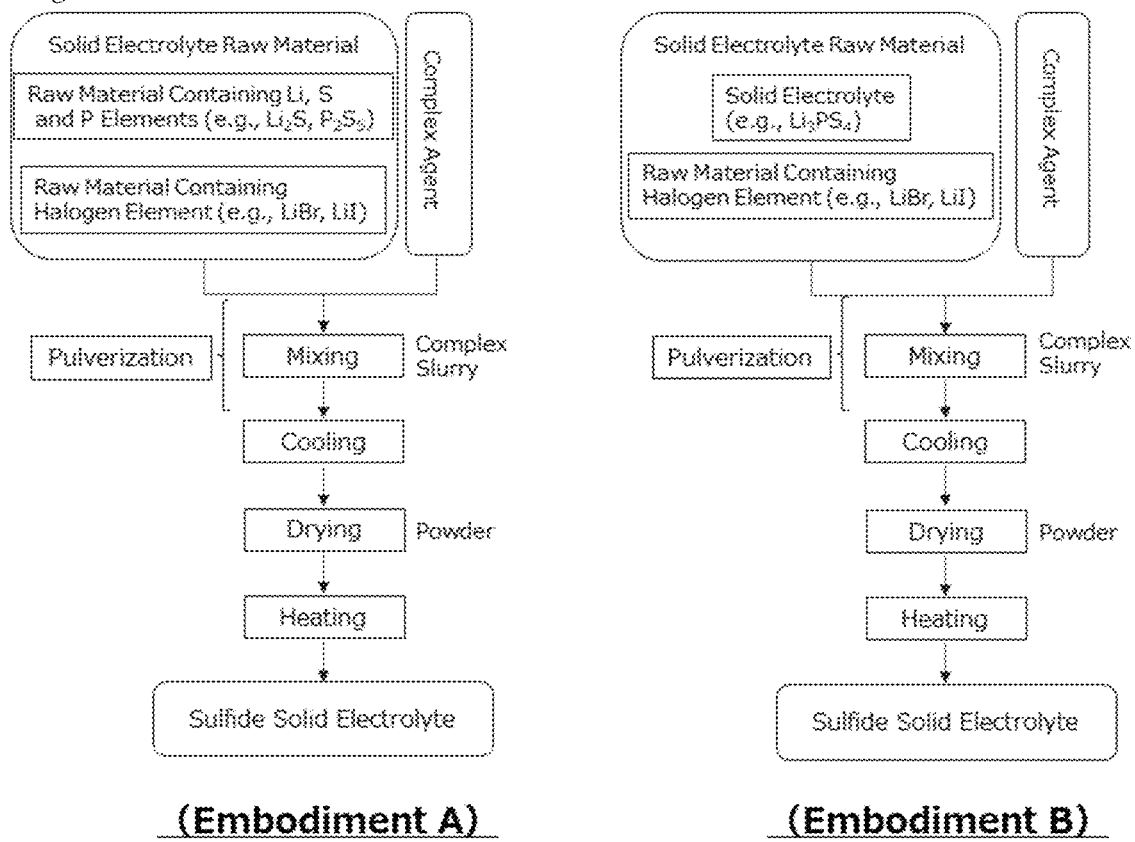

[Fig. 2]
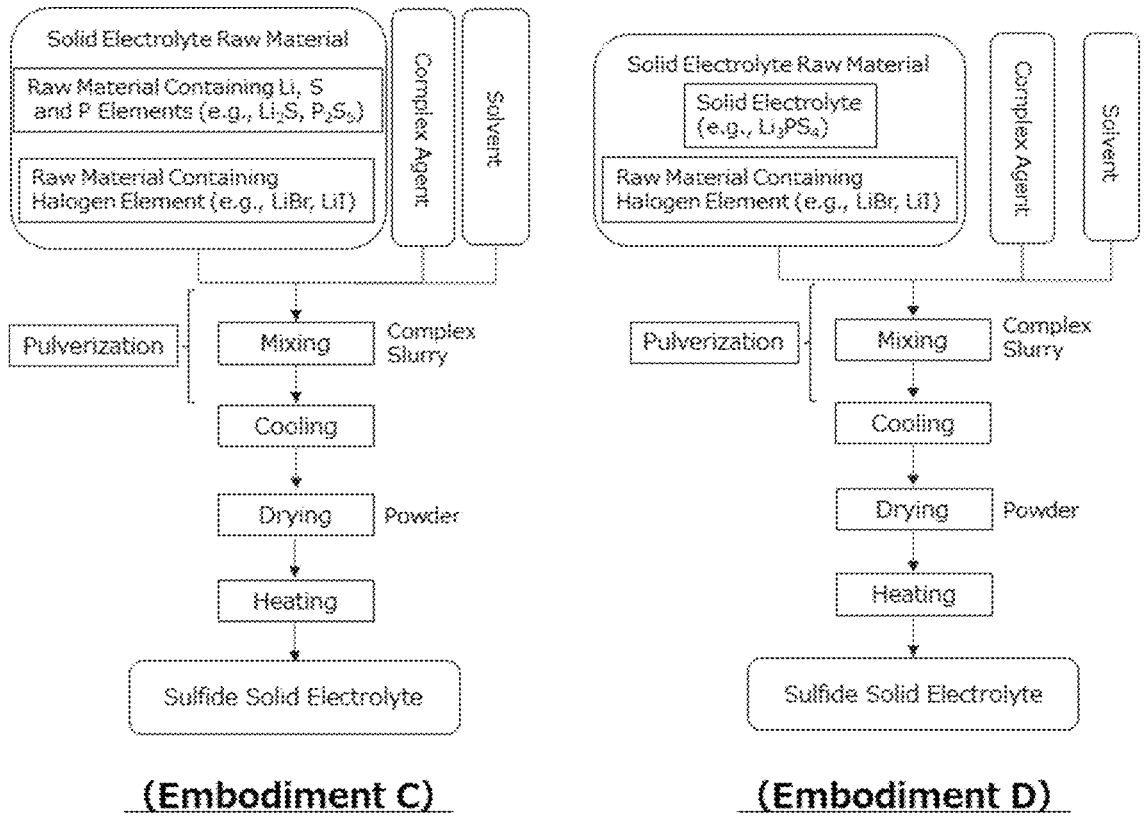
(Embodiment C)          (Embodiment D)
[Fig. 3]
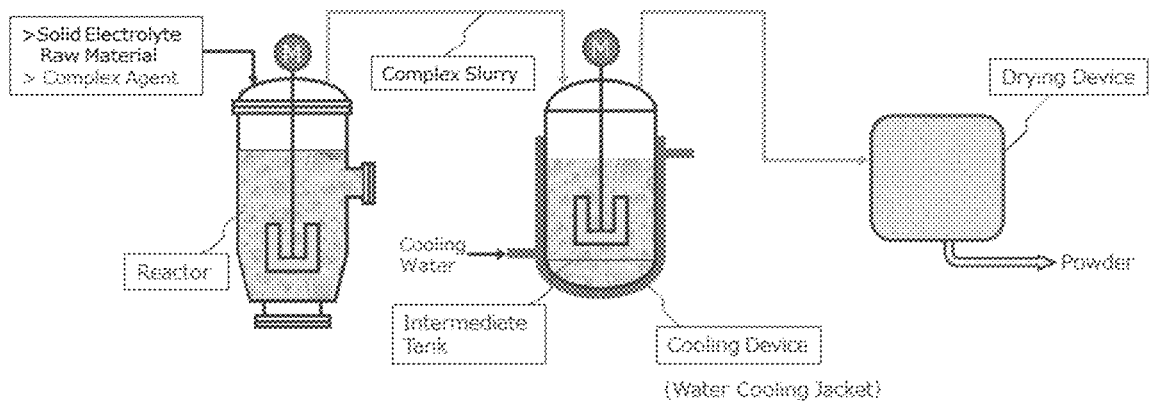

[Fig. 4]
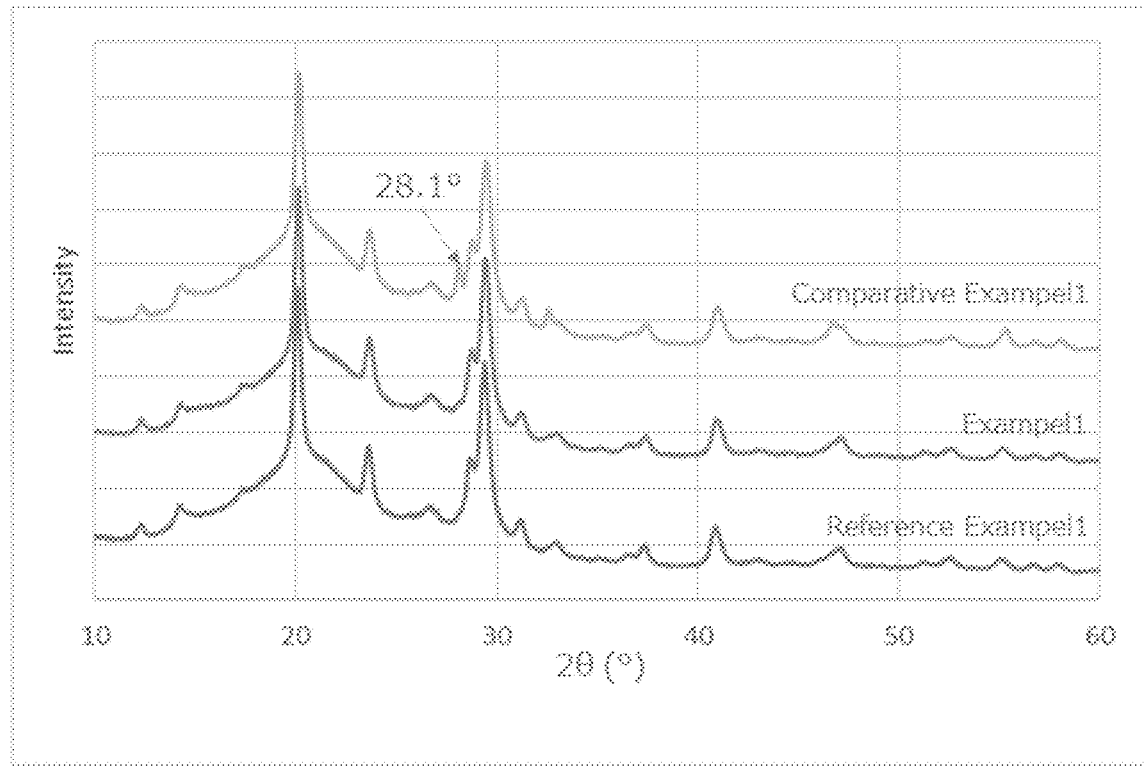
[Fig. 5]
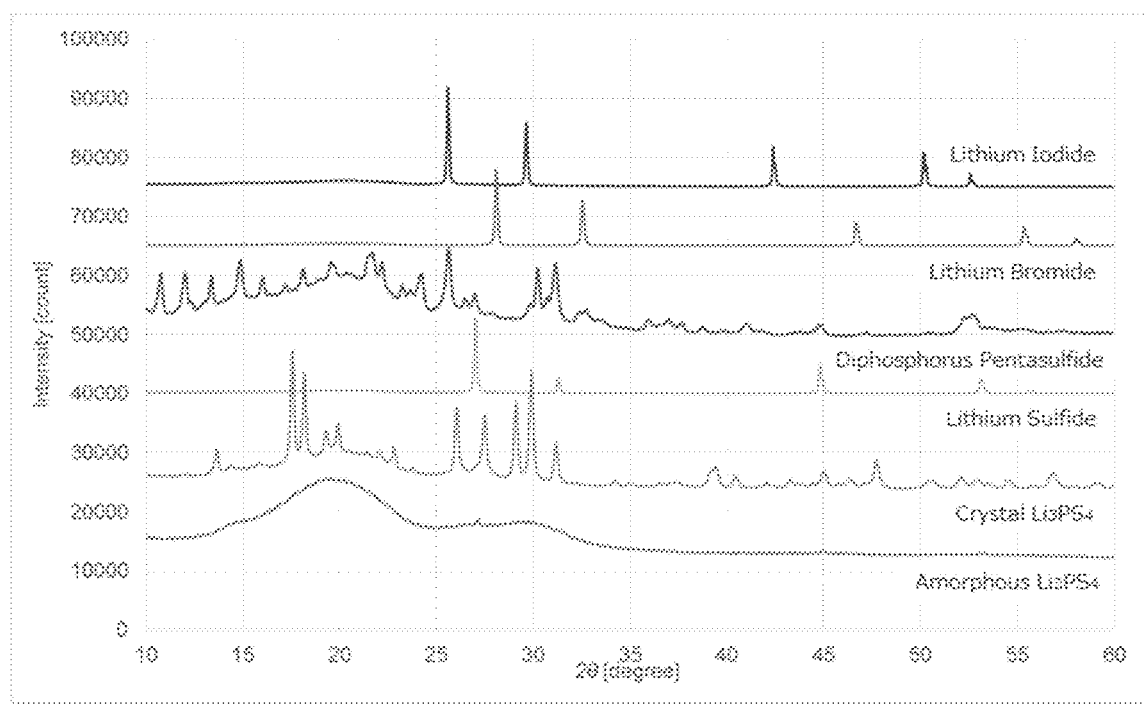

[Fig. 6]
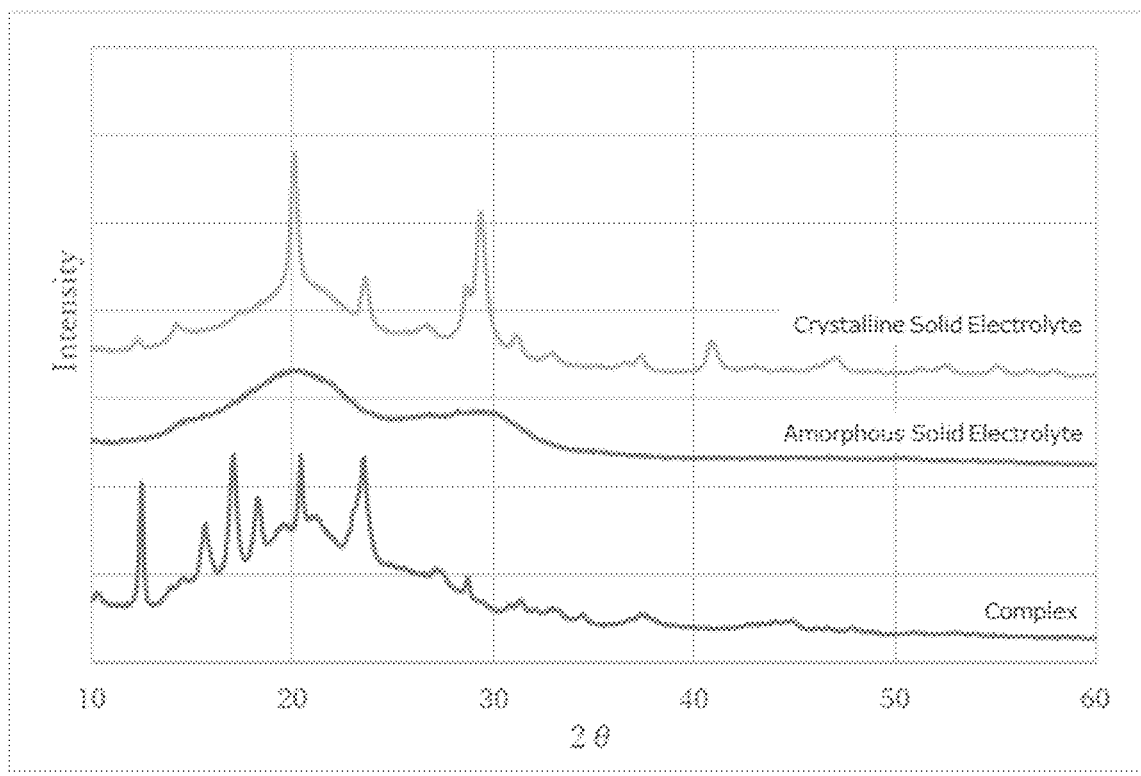

METHOD FOR PRODUCING SULFIDE SOLID ELECTROLYTE

TECHNICAL FIELD

The present invention relates to a method for producing a sulfide solid electrolyte.

BACKGROUND ART

With rapid spread of information-related instruments, communication instruments, and so on, such as personal computers, video cameras, and mobile phones, in recent years, development of batteries that are utilized as a power source therefor is considered to be important. Heretofore, in batteries to be used for such an application, an electrolytic solution containing a flammable organic solvent has been used. However, development of batteries having a solid electrolyte layer in place of an electrolytic solution is being made in view of the fact that by making the battery fully solid, simplification of a safety unit may be realized without using a flammable organic solvent within the battery, and the battery is excellent in manufacturing costs and productivity.

A production method of a solid electrolyte to be used for a solid electrolyte layer is roughly classified into a solid-phase method and a liquid-phase method. Recently, toward practical use of all-solid-state batteries, a liquid-phase method has come to draw attention as a method capable of mass-producing solid electrolytes in a simplified manner in addition to general-purpose versatility and applicability. The liquid-phase method includes a homogeneous method using a solution of a solid electrolyte raw material, and a heterogeneous method using a suspension (slurry) not completely dissolved to co-exist as a solid-liquid state.

In the liquid-phase method, a complex solution (or slurry) of a solid electrolyte raw material is prepared, then the solution is dried to give a complex crystal, thereafter the resulting complex crystal is fired to give a solid electrolyte of a different crystal (see PTL 1). In particular, for preparing a homogeneous solid electrolyte, the homogeneous method is said to be advantageous as going through a solution state where an electrolyte is completely dissolved in a solvent (see NPL 1). Not limited in the field of solid electrolytes, such a method is also investigated as a production method for solar cells (see PTL 2).

CITATION LIST

Patent Literature

PTL 1: WO2018/054709 A
PTL 2: JP 2015-526884 A

Non-Patent Literature

NPL 1: J. Jpn. Soc. Colour Mater., 89[9], 300-305 (2016)

SUMMARY OF INVENTION

Technical Problem

The present invention has been made in consideration of the situation as above, and its object is to provide a method for producing a sulfide solid electrolyte having a high ionic conductivity while suppressing reduction in the ionic conductivity thereof in mass-scale production.

Solution to Problem

The present inventors have made assiduous studies for solving the above-mentioned problems and, as a result, have found that a method for producing a sulfide solid electrolyte including a step of processing a slurry by at least one treatment selected from drying and heating, in which a solid electrolyte raw material containing a lithium element, a sulfur element, a phosphorus element and a halogen element, and a complexing agent are mixed in a reactor to give a complex slurry containing a complex formed of the solid electrolyte raw material and the complexing agent, and the complex slurry is transferred to an intermediate tank equipped with a cooling device and cooled therein, can solve the problems.

Advantageous Effects of Invention

According to the present invention, there can be provided a production method for producing a sulfide solid electrolyte having a high ionic conductivity while suppressing reduction in the ionic conductivity owing to separation of specific components even when a heterogeneous method using a slurry is employed in the production process.

BRIEF DESCRIPTION OF DRAWINGS

FIG. 1 is a flow chart of explaining examples of preferred modes of a production method of the present embodiment.

FIG. 2 is a flow chart of explaining examples of preferred modes of a production method of the present embodiment.

FIG. 3 is a flow chart of explaining one example of a preferred mode of a device for use in the production method of the present embodiment.

FIG. 4 shows X-ray diffraction spectra of sulfide solid electrolytes obtained in Reference Example 1, Example 1 and Comparative Example 1.

FIG. 5 shows X-ray diffraction spectra of solid electrolyte raw materials used in Examples, and amorphous and crystalline $Li_3PS_4$ in Reference Examples 1 and 2.

FIG. 6 shows X-ray diffraction spectra of a complex, an amorphous sulfide solid electrolyte and a crystalline sulfide solid electrolyte obtained in Reference Example 1.

DESCRIPTION OF EMBODIMENTS

Embodiments of the present invention (hereinafter sometimes referred to as "present embodiment") are hereunder described. In this specification, numerical values of an upper limit and a lower limit according to numerical value ranges of "or more", "or less", and "XX to YY" are each a numerical value which can be arbitrarily combined, and numerical values of the section of Examples can also be used as numerical values of an upper limit and a lower limit, respectively.

(Findings that the Inventions have Obtained to Reach the Present Invention)

The present inventors have assiduously studied for solving the above-mentioned problems and, as a result have found the following matters and have completed the present invention.

In a liquid-phase method, investigations of production conditions have been made since uniform dispersion is planned by dissolution of raw materials, but in synthesis of a sulfide solid electrolyte using raw materials of multiple components, it is difficult to homogeneously dissolve without separating a complexing agent solution or constituent component of a slurry and to synthesize the sulfide solid electrolyte. The present inventors have promoted investigations using various complexing agents in a heterogeneous method in coexistence of solid and liquid, but it has become known that the general tendency in mass-scale production is toward reduction in the ionic conductivity of the resultant solid electrolyte.

The present inventors have made further studies about the tendency toward reduction in the ionic conductivity, and have found that, especially in a heterogeneous method in coexistence of solid and liquid, specific components such as a halogen element and a lithium element to be derived from, for example, lithium bromide and lithium iodide that are favorably used as solid electrolyte raw materials (hereinafter the components may be simply referred to as "specific components") are readily separated. When such specific components are separated, a desired compound structure could not be formed and therefore the ionic conductivity of the resultant solid electrolyte may lower. Further, in mass-scale production, it is difficult to produce a sulfide solid electrolyte having a desired crystal structure and having a high ionic conductivity by maintaining a dispersed state of constituent components and to suppress separation of specific components through a series of production steps including a step of mixing a slurry that contains solid electrolyte raw materials and others.

As described above, in production of a sulfide solid electrolyte, it is important to maintain the specific components so as not to be separated from the component for attaining a high ionic conductivity, and for this, a complexing agent is used in the production method of the present embodiment. On the other hand, it is known that, even though a complexing agent is used, when a complex is kept in a slurry state, then specific components separate with time from the complex so that the ionic conductivity lowers. The state where a complex is kept as a slurry may occur in production of a solid electrolyte on a laboratory level, but in mass-scale production in future, the state of keeping a complex as a slurry owing to production process control or instrument trouble may last long most probably to cause a possibility of reduction in an ionic conductivity. In the production method of the present embodiment, a complex slurry is cooled and stored so as to suppress as much as possible the separation of specific components from a complex to thereby make it possible to attain a high ionic conductivity.

Accordingly, the production method of the present embodiment can adapt non only to production of a sulfide solid electrolyte having a higher ionic conductivity but also to a production process for a sulfide solid electrolyte where a complex slurry has been formed and then dried or heated, for example, as mentioned below within a short period of time of 12 hours or less, 6 hours or less, or 1 hour or less to thereby keep the complex as a state of a complex slurry for a long period of time, and therefore can be said to be an effective production method.

The reason why the specific components can be kept inside the complex by cooling and storing to suppress separation thereof is considered to be because the bonding force between the lithium element in the structure such as a $PS_4$ structure to bond via the hetero atom in the complexing agent and the lithium element of a lithium halide in the complex can be maintained so that the chemical stability of the aggregate via the complexing agent in the complex slurry can be kept, but the detailed mechanism thereof is not clear. If the components completely dissolve or do not dissolve at all at a predetermined temperature, there is no influence of solubility (e.g., PTL 2).

However, the complex slurry in the present embodiment is in coexistence of solid and liquid, and therefore the components of the complex each having a different solubility dissolve or do not dissolve and are contained in the slurry. The solubility varies depending on temperature, and therefore it is generally so considered that the temperature of the complex slurry is preferably kept constant for maintaining the solution state of the complex slurry. Moreover, in visual observation of the complex slurry while kept as such for a long period of time, there was found no change irrespective of the presence or absence of cooling in storing. Consequently, it was difficult to find out any problem relating to chemical stability of the complex slurry.

Surprisingly, however, in the production method of the present embodiment, chemical stability of the aggregate via the complexing agent in the complex slurry can be attained by simple operation of merely cooling and storing a complex slurry containing a complex formed of a predetermined element and a complexing agent, and the specific components, especially the bromine component and the lithium component derived from lithium bromide that are readily separable can be prevented from separating, and the production method can have attained a specific effect of giving a sulfide solid electrolyte having a higher ionic conductivity.

[Production Method for Sulfide Solid Electrolyte]

The production method for a sulfide solid electrolyte of the present embodiment is a method for producing a sulfide solid electrolyte including a step of processing a slurry by at least one treatment selected from drying and heating, in which a solid electrolyte raw material containing a lithium element, a sulfur element, a phosphorus element and a halogen element, and a complexing agent are mixed in a reactor to give a complex slurry containing a complex formed of the solid electrolyte raw material and the complexing agent, and the complex slurry is transferred to an intermediate tank equipped with a cooling device and cooled therein.

"The production method for a sulfide solid electrolyte containing a step of processing a slurry by at least one treatment selected from drying and heating" means that, in the production method of the present embodiment, a heterogeneous method of a liquid-phase method is employed in which a solvent not completely dissolving the solid electrolyte raw material is used and a slurry in coexistence of solid and liquid is used. In the present embodiment, the slurry may include a slurry mainly containing a solid electrolyte raw material, and a complex slurry containing a complex to be mentioned hereinunder, and may also include, for example, a slurry that contains at least one selected from a solid electrolyte raw material, a complex, and a sulfide solid electrolyte produced by partially reacting the raw material. In any state where a slurry of any form exists, the heterogeneous method of a liquid-phase method is employed in the production method of the present embodiment with no further discussion.

In the present specification, "sulfide solid electrolyte" means an electrolyte containing at least a sulfur element and maintaining a solid at 25° C. in a nitrogen atmosphere. The sulfide solid electrolyte to be obtained according to the production method of the present embodiment is a solid electrolyte containing a lithium element, a sulfur element, a phosphorus element and a halogen element and having an ionic conductivity resulting from the lithium element.

"Sulfide solid electrolyte" includes both a crystalline sulfide solid electrolyte having a crystal structure and an amorphous sulfide solid electrolyte. In the present specification, the crystalline sulfide solid electrolyte is a solid electrolyte that gives sulfide solid electrolyte-derived peaks in the X-ray diffraction pattern in X-ray diffractometry, and is a material to which the presence or absence of peaks derived from solid electrolyte raw materials does not matter. Specifically, the crystalline sulfide solid electrolyte may contain a crystal structure derive from a sulfide solid electrolyte, and a part thereof may be a crystal structure derived from the sulfide solid electrolyte or all thereof may be a crystal structure derived from the sulfide solid electrolyte. With that, the crystalline sulfide solid electrolyte may partly contain an amorphous sulfide solid electrolyte so far as it has the above-mentioned X-ray diffraction pattern. Accordingly, the crystalline sulfide solid electrolyte includes so-called glass ceramics to be obtained by heating an amorphous sulfide solid electrolyte at a temperature not lower than the crystallization temperature thereof.

In the present specification, an amorphous sulfide solid electrolyte is such that the X-ray diffraction pattern thereof in X-ray diffractometry is a halo pattern not substantially giving any other peak than the peaks derived from the material of the sulfide solid electrolyte, and the presence or absence of peaks derived from raw materials of the solid electrolyte raw materials does not matter to it.

The production method for a sulfide solid electrolyte of the present embodiment preferably includes the following four types of embodiments differing from each other depending on whether or not a solid electrolyte such as $Li_3PS_4$ is used as a solid electrolyte raw material, or whether or not a solvent is used. Preferred examples of these four kinds of embodiments are shown in FIG. 1 (Embodiments A and B) and FIG. 2 (Embodiments C and D). Specifically, the production method of the present embodiment preferably includes a production method using raw materials such as lithium sulfide and diphosphorus pentasulfide and a complexing agent (Embodiment A); a production method containing a solid electrolyte such as $Li_3PS_4$ of an electrolyte main structure as a raw material and using a complexing agent (Embodiment B); a production method of the above Embodiment A in which a solvent is added to a raw material such as lithium sulfide and a complexing agent (Embodiment C); and a production method of the above Embodiment B in which a solvent is added to the solid electrolyte such as $Li_3PS_4$ to be a raw material and a complexing agent (Embodiment D).

Embodiments A to D are hereunder described in order.

Embodiment A

As shown in FIG. 1, the Embodiment A is a production method for a sulfide solid electrolyte including a step of processing a slurry by at least one treatment selected from drying and heating, in which a solid electrolyte raw material containing a lithium element, a sulfur element, a phosphorus element and a halogen element, and a complexing agent are mixed in a reactor, and in which as solid electrolyte raw materials, a raw material containing a lithium element, a sulfur element and a phosphorus element such as lithium sulfide and diphosphorus pentasufide, and a raw material containing a halogen element such as lithium bromide and lithium iodide are used. By mixing a solid electrolyte raw material and a complexing agent in a reactor, in general, a complex slurry containing a complex formed of the solid electrolyte raw material and the complexing agent is produced, and by cooling the resultant complex slurry, a sulfide solid electrolyte is produced. Preferably, the Embodiment A includes at least one step selected from drying and heating after cooling and storing.

The production method of the present embodiment includes pulverizing the complex, and preferably the complex contained in the complex slurry contains the pulverized complex. Also preferably, cooling and storing is carried out after pulverizing, or in the case where the process includes heating, is carried out after pulverizing and before heating, that is, the pulverizing is preferably carried out during mixing (simultaneously with mixing), or after mixing and before cooling and storing.

While the description is hereunder made beginning from the Embodiment A, one described with the wordings "of the present embodiment" is a matter applicable even to other embodiments.

(Solid Electrolyte Raw Material)

The solid electrolyte raw material for use in the present embodiment contains a lithium element, a sulfur element, a phosphorus element and a halogen element, and specifically, one or more raw materials selected from raw materials containing at least one of those elements are used here.

Typical examples of the raw materials (compounds) containing at least one of a lithium element, a sulfur element, a phosphorus element and a halogen element, which are contained in the solid electrolyte raw material, include raw materials composed of at least two elements selected from the above-mentioned four elements, such as lithium sulfide; lithium halides, e.g., lithium fluoride, lithium chloride, lithium bromide, and lithium iodide; phosphorus sulfides, e.g., diphosphorus trisulfide ($P_2S_3$) and diphosphorus pentasulfide ($P_2S_5$); phosphorus halides, e.g., various phosphorus fluorides (e.g., $PF_3$ and $PF_5$), various phosphorus chlorides (e.g., $PCl_3$, $PCl_5$, and $P_2Cl_4$), various phosphorus bromides (e.g., $PBr_3$ and $PBr_5$), and various phosphorus iodides (e.g., $PI_3$ and $P_2I_4$); and thiophosphoryl halides, e.g., thiophosphoryl fluoride ($PSF_3$), thiophosphoryl chloride ($PSCl_3$), thiophosphoryl bromide ($PSBr_3$), thiophosphoryl iodide ($PSI_3$), thiophosphoryl dichlorofluoride ($PSCl_2F$), and thiophosphoryl dibromofluoride ($PSBr_2F$), as well as halogen simple substances, such as fluorine ($F_2$), chlorine ($Cl_2$), bromine ($Br_2$), and iodine ($I_2$), with bromine ($Br_2$) and iodine ($I_2$) being preferred.

As materials which may be used as the raw material other than those mentioned above, a compound containing not only at least one element selected from the above-mentioned four elements but also other element than the foregoing four elements can be used. More specifically, examples thereof include lithium compounds, such as lithium oxide, lithium hydroxide, and lithium carbonate; alkali metal sulfides, such as sodium sulfide, potassium sulfide, rubidium sulfide, and cesium sulfide; metal sulfides, such as silicon sulfide, germanium sulfide, boron sulfide, gallium sulfide, tin sulfide (e.g., SnS and $SnS_2$), aluminum sulfide, and zinc sulfide; phosphoric acid compounds, such as sodium phosphate and lithium phosphate; halide compounds of an alkali metal other than lithium, such as sodium halides, e.g., sodium iodide, sodium fluoride, sodium chloride, and sodium bromide; metal halides, such as an aluminum halide, a silicon halide, a germanium halide, an arsenic halide, a selenium halide, a tin halogen, an antimony halide, a tellurium halide, and a bismuth halide; and phosphorus oxyhalides, such as phosphorus oxychloride ($POCl_3$) and phosphorus oxybromide ($POBr_3$).

As the solid electrolyte raw material, raw materials suitable for forming a desired crystal structure can be appropriately selected from those mentioned above, and from the viewpoint of obtaining a sulfide solid electrolyte having a high ionic conductivity in a more simplified manner, among the above, the raw materials are preferably phosphorus sulfides, such as lithium sulfide, diphosphorus trifluoride ($P_2S_3$), and diphosphorus pentasulfide ($P_2S_5$); halogen simple substances, such as fluorine ($F_2$), chlorine ($Cl_2$), bromine ($Br_2$), and iodine ($I_2$); and lithium halides, such as lithium fluoride, lithium chloride, lithium bromide, and lithium iodide are preferred.

Preferred examples of a combination of raw materials include a combination of a raw material containing a lithium element, a sulfur element and a phosphorus element such as lithium sulfide and diphosphorus pentasulfide, and a raw material containing a halogen element such as a lithium halide, and a combination of a raw material containing a lithium element, a sulfur element and a phosphorus element such as lithium sulfide and diphosphorus pentasulfide, and a raw material containing a halogen element such as a halogen simple substance. The lithium halide is preferably lithium bromide and lithium iodide, and the halogen simple substance is preferably chlorine, bromine and iodine, more preferably bromide and iodine.

The lithium sulfide which is used in the Embodiment A is preferably a particle.

An average particle diameter ($D_{50}$) of the lithium sulfide particle is preferably 10 μm or more and 2,000 μm or less, more preferably 30 μm or more and 1,500 μm or less, and still more preferably 50 μm or more and 1,000 μm or less. In this specification, the average particle diameter ($D_{50}$) is a particle diameter to reach 50% of all the particles in sequential cumulation from the smallest particles in drawing the particle diameter distribution cumulative curve, and the volume distribution is concerned with an average particle diameter which can be, for example, measured with a laser diffraction/scattering particle diameter distribution measuring device. In addition, among the above-exemplified raw materials, the solid raw material is preferably one having an average particle diameter of the same degree as in the above-mentioned lithium sulfide particle, namely one having an average particle diameter falling within the same range as in the above-mentioned lithium sulfide particle is preferred.

In the case of using lithium sulfide, diphosphorus pentasulfide, and the lithium halide as the raw materials, from the viewpoint of obtaining higher chemical stability and a higher ionic conductivity, a proportion of lithium sulfide relative to the total of lithium sulfide and diphosphorus pentasulfide is preferably 70 to 80 mol %, more preferably 72 to 78 mol %, and still more preferably 74 to 76 mol %.

In the case of using lithium sulfide, diphosphorus pentasulfide, a lithium halide, and other raw material to be optionally used, the content of lithium sulfide and diphosphorus pentasulfide relative to the total of the above-mentioned raw materials is preferably 60 to 100 mol %, more preferably 65 to 90 mol %, and still more preferably 70 to 80 mol %.

In the case of using a combination of lithium bromide and lithium iodide as the lithium halide, from the viewpoint of enhancing the ionic conductivity, a proportion of lithium bromide relative to the total of lithium bromide and lithium iodide is preferably 1 to 99 mol %, more preferably 20 to 90 mol %, still more preferably 40 to 80 mol %, and especially preferably 45 to 65 mol %.

In the case of using not only a halogen simple substance but also lithium sulfide and diphosphorus pentasulfide as the raw materials, a proportion of the molar number of lithium sulfide excluding lithium sulfide having the same molar number as the molar number of the halogen simple substance relative to the total molar number of lithium sulfide and diphosphorus pentasulfide excluding lithium sulfide having the same molar number as the molar number of the halogen simple substance falls preferably within a range of 60 to 90%, more preferably within a range of 65 to 85%, still more preferably within a range of 68 to 82%, yet still more preferably within a range of 72 to 78%, and even yet still more preferably within a range of 73 to 77%. This is because when the foregoing proportion falls within the above-mentioned ranges, a higher ionic conductivity is obtained. In addition, in the case of using lithium sulfide, diphosphorus pentasulfide, and a halogen simple substance, from the same viewpoint, the content of the halogen simple substance relative to the total amount of lithium sulfide, diphosphorus pentasulfide, and the halogen simple substance is preferably 1 to 50 mol %, more preferably 2 to 40 mol %, still more preferably 3 to 25 mol %, and yet still more preferably 3 to 15 mol %.

In the case of using lithium sulfide, diphosphorus pentasulfide, a halogen simple substance, and a lithium halide, the content (α mol %) of the halogen simple substance and the content (β mol %) of the lithium halide relative to the total of the above-mentioned raw materials preferably satisfy the following expression (2), more preferably satisfy the following expression (3), still more preferably satisfy the following expression (4), and yet still more preferably satisfy the following expression (5).

$$2 \leq (2\alpha+\beta) \leq 100 \tag{2}$$

$$4 \leq (2\alpha+\beta) \leq 80 \tag{3}$$

$$6 \leq (2\alpha+\beta) \leq 50 \tag{4}$$

$$6 \leq (2\alpha+\beta) \leq 30 \tag{5}$$

In the case of using two halogen simple substances, when the molar number in the substance of the halogen element of one side is designated as A1, and the molar number in the substance of the halogen element of the other side is designated as A2, an A1/A2 ratio is preferably (1 to 99)/(99 to 1), more preferably 10/90 to 90/10, still more preferably 20/80 to 80/20, and yet still more preferably 30/70 to 70/30.

In the case where the two halogen simple substances are bromine and iodine, when the molar number of bromine is designated as B1, and the molar number of iodine is designated as B2, a B1/B2 ratio is preferably (1 to 99)/(99 to 1), more preferably 15/85 to 90/10, still more preferably 20/80 to 80/20, yet still more preferably 30/70 to 75/25, and especially preferably 35/65 to 75/25.

(Complexing Agent)

In the production method for a solid electrolyte of the present embodiment, a complexing agent is used. The complexing agent as referred to in this specification is a substance capable of forming a complex together with a lithium element and means one having such properties of acting with a lithium element-containing sulfide and a halide contained in the above-mentioned solid electrolyte raw material, thereby promoting formation of a complex. Accordingly, if a complexing agent is not used, a complex would be difficult to form, and therefore it would be impossible to suppress separation of specific components and a high ionic conductivity could not be obtained.

Not specifically limited, the complexing agent usable here may be any one having the above-mentioned properties. A compound containing an element having a high affinity with a lithium element, for example, a hetero element such as a nitrogen element, an oxygen element and a chlorine element is preferred, and a compound having a group that contains such a hetero element is more preferred. This is because, such a hetero element, and a group containing such a hetero element can form a coordination (bond) to lithium.

Regarding the complexing agent, the hetero element in the molecule thereof has a high affinity with a lithium element, and it is considered that the complexing agent has such a property that can readily form a lithium-containing structure such as $Li_3PS_4$ typically containing a $PS_4$ structure existing as a main structure in the sulfide solid electrolyte obtained according to the production method of the present embodiment, or an aggregate bonding to a lithium-containing raw material such as a lithium halide. In the present embodiment, "complex formed by a solid electrolyte raw material and a complexing agent" is a collective term indicating such a structure and an aggregate, and is preferably formed of a complexing agent, a lithium element, a sulfur element, a phosphorus element and a halogen element. For that reason, since by mixing the above-mentioned solid electrolyte raw material and the complexing agent, an aggregate via the lithium-containing structure, such as a $PS_4$ structure, or the complexing agent, and an aggregate via the lithium-containing raw material, such as a lithium halide, or the complexing agent are evenly existent, whereby a complex in which the halogen element is more likely dispersed and fixed is obtained, and as a result, it may be considered that a sulfide solid electrolyte capable of suppressing reduction in ionic conductivity due to separation of specific components and therefore having a high ionic conductivity can be obtained.

Accordingly, the complexing agent preferably has at least two coordinative (bonding) hetero elements in the molecule, more preferably has at least two hetero element-containing groups in the molecule. Having at least two hetero element-containing groups in the molecule, the complexing agent can act to bond a lithium-containing structure such as $Li_3PS_4$ having a $PS_4$ structure, and a lithium-containing raw material such as a lithium halide, via at least two hetero elements in the molecule, and accordingly, the halogen element can more effectively disperse and fix in the resultant complex. As a result, without lowering the ionic conductivity due to separation of such specific components, a sulfide solid electrolyte having a high ionic conductivity can be obtained. Among hetero atoms, a nitrogen atom is preferred, and as a nitrogen atom-containing group, an amino group is preferred. Specifically, as the complexing agent, an amine compound is preferred.

Not specifically limited, the amine compound may be any one having an amino group in the molecule as the compound of the type can promote complex formation. Preferred is a compound having at least two amino groups in the molecule. Having such a structure, the compound can act to bond a lithium-containing structure such as $Li_3PS_4$ having a $PS_4$ structure, and a lithium-containing raw material such as a lithium halide, via at least two nitrogen elements in the molecule, and accordingly, the halogen element can more effectively disperse and fix in the resultant complex. As a result, a sulfide solid electrolyte having a high ionic conductivity can be obtained.

Examples of such an amine compound include amine compounds, such as aliphatic amines, alicyclic amines, heterocyclic amines, and aromatic amines, and these amine compounds can be used alone or in combination of plural kinds thereof.

More specifically, the aliphatic amine is preferably an aliphatic diamine, and typically preferred examples thereof include an aliphatic primary diamine such as ethylenediamine, diaminopropane, and diaminobutane; an aliphatic secondary diamine such as N,N'-dimethylethylenediamine, N,N'-diethylethylenediamine, N,N'-dimethyldiaminopropane, and N,N'-diethyldiaminopropane; and an aliphatic tertiary diamine such as N,N,N',N'-tetramethyldiaminomethane, N,N,N',N'-tetramethylethylenediamine, N,N,N',N'-tetraethylethylenediamine, N,N,N',N'-tetramethyldiaminopropane, N,N,N',N'-tetraethyldiaminopropane, N,N,N',N'-tetramethyldiaminobutane, N,N,N',N'-tetramethyldiaminopentane, and N,N,N',N'-tetramethyldiaminohexane. Here, in the exemplification in this specification, for example, when the diaminobutane is concerned, it should be construed that all of isomers inclusive of not only isomers regarding the position of the amino group, such as 1,2-diaminobutane, 1,3-diaminobutane, and 1,4-diaminobutane, but also linear or branched isomers and so on regarding the butane are included unless otherwise noted.

The carbon number of the aliphatic amine is preferably 2 or more, more preferably 4 or more, and still more preferably 6 or more, and an upper limit thereof is preferably 10 or less, more preferably 8 or less, and still more preferably 7 or less. In addition, the carbon number of the hydrocarbon group of the aliphatic hydrocarbon group in the aliphatic amine is preferably 2 or more, and an upper limit thereof is preferably 6 or less, more preferably 4 or less, and still more preferably 3 or less.

The alicyclic amine is preferably an alicyclic diamine, and typically preferred examples thereof include an alicyclic primary diamine such as cyclopropanediamine, and cyclohexanediamine; an alicyclic secondary diamine such as bisaminomethylcyclohexane; and an alicyclic tertiary diamine such as N,N,N',N'-tetramethyl-cyclohexanediamine and bis(ethylmethylamino)cyclohexane. The heterocyclic amine is preferably a heterocyclic diamine, and typically preferred examples thereof include a heterocyclic primary diamine such as isophoronediamine; a heterocyclic secondary diamine such as piperazine, and dipiperidylpropane; and a heterocyclic tertiary diamine such as N,N-dimethylpiperazine and bismethylpiperidylpropane.

The carbon number of each of the alicyclic amine and the heterocyclic amine is preferably 3 or more, and more preferably 4 or more, and an upper limit thereof is preferably 16 or less, and more preferably 14 or less.

The aromatic amine is preferably an aromatic diamine, and typically preferred examples thereof include an aromatic primary diamine such as phenyldiamine, tolylenediamine, and naphthalenediamine; an aromatic secondary diamine such as N-methylphenylenediamine, N,N'-dimethylphenylenediamine, N,N'-bismethylphenylphenylenediamine, N,N'-dimethylnaphthalenediamine, and N-naphthylethylenediamine; and an aromatic tertiary diamine such as N,N-dimethylphenylenediamine, N,N,N',N'-tetramethylphenylenediamine, N,N,N',N'-tetramethyldiaminodiphenylmethane, and N,N,N',N'-tetramethylnaphthalenediamine.

The carbon number of the aromatic amine is preferably 6 or more, more preferably 7 or more, and still more preferably 8 or more, and an upper limit thereof is preferably 16 or less, more preferably 14 or less, and still more preferably 12 or less.

The amine compound which is used in the present embodiment may also be one substituted with a substituent, such as an alkyl group, an alkenyl group, an alkoxy group, a hydroxy group, and a cyano group, or a halogen atom.

While the diamines have been exemplified as specific examples, needless to say, the amine compound which may be used in the present embodiment is not limited to the diamines. For example, herein usable are monoamines, such as aliphatic monoamines corresponding to various diamines such as the above-mentioned aliphatic diamines, e.g., trimethylamine, triethylamine, and ethyldimethylamine; piperidine compounds such as piperidine, methylpiperidine, and tetramethylpiperidine; pyridine compounds such as pyridine and picoline; morpholine compounds such as morpholine, methylmorpholine, and thiomorpholine; imidazole compounds such as imidazole, and methylimidazole; alicyclic monoamines such as monoamines corresponding to the above-mentioned alicyclic diamines; heterocyclic monoamines corresponding to the above-mentioned heterocyclic diamines; aromatic monoamines corresponding to the above-mentioned aromatic diamines; as well as polyamines having 3 or more amino groups, such as diethylenetriamine, N,N',N"-trimethyldiethylenetriamine, N,N,N',N",N"-pentamethyldiethylenetriamine, triethylenetetramine, N,N'-bis [(dimethylamino)ethyl]-N,N'-dimethylethylenediamine, hexamethylenetetramine, and tetraethylenepentamine.

Among those described above, from the viewpoint of obtaining a higher ionic conductivity, tertiary diamines having a tertiary amino group are preferred; tertiary diamines having two tertiary amino groups are more preferred; tertiary diamines having two tertiary amino groups on both ends are still more preferred, and aliphatic tertiary diamines having a tertiary amino group on both ends are yet still more preferred. In the above-mentioned amine compounds, as the aliphatic tertiary diamine having a tertiary amino group on both ends, tetramethylethylenediamine, tetraethylethylenediamine, tetramethyldiaminopropane, and tetraethyldiaminopropane are preferred, and taking into account easiness of availability and so on, tetramethylethylenediamine and tetramethyldiaminopropane are preferred.

As other complexing agents than the amine compound, for example, a compound having a group containing a hetero element, such as a halogen element, e.g., an oxygen element and a chlorine element, is high in an affinity with the lithium element, and such a compound is exemplified as the other complexing agent than the amine compound. In addition, a compound having a group containing, as the hetero element, a nitrogen element other than the amino group, for example, a nitro group and an amide group, provides the same effects.

Examples of the other complexing agent include alcohol-based solvents, such as ethanol and butanol; ester-based solvents, such as ethyl acetate and butyl acetate; aldehyde-based solvents, such as formaldehyde, acetaldehyde, and dimethylformamide; ketone-based solvents, such as acetone and methyl ethyl ketone; ether-based solvents, such as diethyl ether, diisopropyl ether, dibutyl ether, tetrahydrofuran, dimethoxyethane, cyclopentyl methyl ether, tert-butyl methyl ether, and anisole; halogen element-containing aromatic hydrocarbon solvents, such as trifluoromethylbenzene, nitrobenzene, chlorobenzene, chlorotoluene, and bromobenzene; and solvents containing a carbon atom and a hetero atom, such as acetonitrile, dimethyl sulfoxide, and carbon disulfide. Of these, ether-based solvents are preferred; diethyl ether, diisopropyl ether, dibutyl ether, and tetrahydrofuran are more preferred; and diethyl ether, diisopropyl ether, and dibutyl ether are still more preferred.

(Mixing)

As shown in the flow chart of FIG. 1, the solid electrolyte raw material and the complexing agent are mixed in a reactor to give a complex slurry containing the above-mentioned complex formed by the solid electrolyte raw material and the complexing agent. In the present embodiment, the mode of mixing the solid electrolyte raw material and the complexing agent is generally a slurry mode in which the solid electrolyte raw material in a solid form exists in the complexing agent in a liquid form since the complexing agent is liquid.

The amount of the solid electrolyte raw material is preferably 5 g or more relative to 1 L of the complexing agent, or in the case where a solvent to be mentioned hereinunder is used, 1 L of the total amount of the solvent and the complexing agent, more preferably 10 g or more, even more preferably 30 g or more, further more preferably 45 g or more, and the upper limit is preferably 500 g or less, more preferably 400 g or less, even more preferably 300 g or less, further more preferably 250 g or less. When the content of the solid electrolyte raw material falls within the above range, the solid electrolyte raw material becomes easy to mix, and the dispersion condition of the solid electrolyte raw material betters to accelerate the reaction between the raw materials, and therefore the complex, even further the solid electrolyte can become efficiently obtained.

The method of mixing the solid electrolyte raw material and the complexing agent is not specifically limited. At least one raw material (compound) contained in the solid electrolyte raw material and the complexing material may be put into a reactor of a device, in which the solid electrolyte raw material and the complexing material can be mixed in the reactor, and mixed therein. For example, a complexing material is fed into a reactor shown in FIG. 3, then the impeller is driven, and thereafter a solid electrolyte raw material is gradually added thereto, whereby a good mixing state of the raw material can be attained and the dispersibility of the raw material also improves to readily give a complex, and the embodiment is preferred.

In the case where a halogen simple substance is used as the raw material, the raw material is not often solid, and concretely, under room temperature and normal pressure, fluorine and bromine are gaseous and bromine is liquid. For example, in the case where the raw material is liquid, the liquid raw material may be fed into a reactor along with a complexing material, separately from the other solid raw materials. In the case where the raw material is gaseous, the gaseous raw material may be jetted into a mixture prepared by adding a solid electrolyte raw material to a complexing material.

The production method for a sulfide solid electrolyte of the present embodiment is characterized by including mixing a solid electrolyte raw material and a complexing agent, and using a reactor equipped with an impeller, for example, as shown in FIG. 3, these may be mixed. The sulfide solid electrolyte may also be produced according to a method not using a machine to be used for the purpose of pulverizing a solid material generally called a pulverizer, for example, a medium-assisted pulverizing machine such as a ball mill or a bead mill. According to the production method of the present embodiment, a solid electrolyte raw material and a complexing agent may be merely mixed in a reactor to give a complex formed of the solid electrolyte raw material and the complexing material. As needed, the resultant complex may be dried and heated to give a sulfide solid electrolyte.

One example of the device for mixing the solid electrolyte raw material and the complexing agent is a mechanically stirring and mixing machine equipped with an impeller in the reactor thereof. The mechanical stirring and mixing machine includes a high-speed stirring mixer, and a double-arm mixer. A high-speed stirring mixer is preferably used from the viewpoint of increasing the homogeneity of the raw materials in the mixture of the solid electrolyte raw material and the complexing agent and obtaining a higher ionic conductivity. In addition, examples of the high-speed stirring mixer include a vertical axis rotating type mixer and a lateral axis rotating type mixer, and mixers of any of these types may be used.

Examples of the shape of the impeller which is used in the mechanical stirring mixer include a blade type, an arm type, a ribbon type, a multistage blade type, a double arm type, a shovel type, a twin-shaft blade type, a flat blade type, and a C-shaped blade type. From the viewpoint of increasing the homogeneity of the raw materials in the mixture of the solid electrolyte raw material and the complexing agent to give efficiently a homogeneous complex having a higher ionic conductivity, a shovel type, a flat blade type, or a C-shaped blade type impeller is preferred.

The temperature condition in mixing the solid electrolyte raw material and the complexing agent is not particularly limited, and for example, it is −30 to 100° C., preferably −10 to 50° C., and more preferably around room temperature (23° C.) (for example, (room temperature)±about 5° C.). The mixing time is about 0.1 to 150 hours, and from the viewpoint of more uniformly mixing to attain a higher ionic conductivity, the mixing time is preferably 0.3 to 120 hours, more preferably 0.5 to 100 hours, and still more preferably 0.8 to 80 hours. Accordingly, the reactor may be optionally equipped with a heating means for heating the fluid in the reactor.

By mixing the solid electrolyte raw material and the complexing agent in a reactor, owing to the action of the lithium element, the sulfur element, the phosphorus element and the halogen element contained in the raw materials, and the complexing agent, a complex in which these elements are bound directly with each other via and/or not via the complexing agent is obtained. That is, in the production method of the present embodiment, the complex obtained through mixing of the solid electrolyte raw material and the complexing agent is constituted of the complexing agent, the lithium element, the sulfur element, the phosphorus element and the halogen element, and by mixing the solid electrolyte raw material and the complexing agent, the resultant slurry does not completely dissolve in the complex that is liquid, and a slurry containing such a solid complex is obtained. Accordingly, the production method of the present embodiment corresponds to a heterogeneous system in a so-called liquid-phase method. The slurry can be called a complex slurry that contains a complex, but can also be considered to contain the solid electrolyte raw material not having formed a complex, and the complexing agent, and also a solid electrolyte formed by reaction or a part of the solid electrolyte raw material.

(Complex)

As described above, the complex is formed of the complexing agent, the lithium element, the sulfur element, the phosphorus element, and the halogen element. In the X-ray diffraction pattern in the X-ray diffractometry, peaks different from the peaks derived from the raw materials are observed, and accordingly, it is typically considered that the complex preferably has a complex structure where the lithium element directly bonds to the other elements via and/or not via the complexing agent. When the solid electrolyte raw material alone is merely mixed, the peaks derived from the raw materials are merely observed, whereas when the solid electrolyte raw material and the complexing agent are mixed, peaks different from the peaks derived from the raw materials are observed. Thus, the complex formed by mixing these has a structure explicitly different from the raw materials themselves contained in the solid electrolyte raw material. This matter is specifically confirmed in the section of Examples. FIGS. 4 to 6 show measurement examples of the X-ray diffraction patterns of various raw materials such as lithium sulfide, the complex and the sulfide solid electrolyte. It is noted from the X-ray diffraction patterns in FIG. 6 that the complex has a predetermined crystal structure. The diffraction pattern of the complex does not contain the diffraction patterns of any raw materials, such as lithium sulfide, as shown in FIG. 5, and thus, it is noted that the complex has a crystal structure different from the raw materials.

The complex has such a characteristic feature that it has a structure different from the crystalline solid electrolyte. This matter is also specifically confirmed in the section of Examples. The X-ray diffraction pattern of the crystalline solid electrolyte is also shown in FIG. 4, and it is noted that the foregoing diffraction pattern is different from the diffraction pattern of the complex. The complex has a predetermined crystal structure and is different from the amorphous solid electrolyte having a broad pattern.

From the above results, it may be agreed that the crystal is constituted of the complexing agent, the lithium element, the sulfur element, the phosphorus element, and the halogen element, and typically, it may be presumed that a complex structure in which the lithium element and the other elements are bound directly with each other via and/or not via the complexing agent is formed.

Here, the fact that the complexing agent constitutes the complex can be, for example, confirmed through gas chromatography analysis. Specifically, the complexing agent contained in the complex can be quantitated by dissolving a powder of the complex in methanol and subjecting the resultant methanol solution to gas chromatography analysis.

Although the content of the complexing agent in the complex varies with the molecular weight of the complexing agent, it is typically about 10% by mass or more and 70% by mass or less, and preferably 15% by mass or more and 65% by mass or less.

In the present embodiment, what the complex containing the halogen element is formed is preferred from the standpoint of enhancing the ionic conductivity. By using the complexing agent, the lithium-containing structure, such as a $PS_4$ structure, and the lithium-containing raw materials, such as a lithium halide, are bound (coordinated) with each other via the complexing agent, the complex in which the halogen element is more likely dispersed and fixed is readily obtained, and these specific components do not separate to suppress reduction in the ionic conductivity, and a high ionic conductivity can be therefore achieved.

The matter that the halogen element in the complex constitutes the complex can be confirmed from the fact that even when the solid-liquid separation of the complex slurry is performed, the predetermined amount of the halogen element is still contained in the complex. This is because the halogen element which does not constitute the precursor is easily eluted as compared with the halogen element constituting the crystal and discharged out into the liquid in solid-liquid separation. In addition, the foregoing matter can also be confirmed from the fact that by performing composition analysis through ICP analysis (inductively coupled plasma atomic emission spectrophotometry) of the complex or the sulfide solid electrolyte, a proportion of the halogen element in the complex or the sulfide solid electrolyte is not remarkably lowered as compared with the proportion of the halogen element fed from the raw materials.

The amount of the halogen element remaining in the complex is preferably 30% by mass or more, more preferably 35% by mass or more, and still more preferably 40% by mass or more relative to the charged composition. The upper limit of the halogen element remaining in the electrolyte precursor is 100% by mass.

(Cooling)

The production method for a sulfide solid electrolyte of the present embodiment includes transferring the complex slurry into an intermediate tank equipped with a cooling device and cooling it therein (hereinafter cooling is substantially accompanied with storing, and therefore cooling may be merely referred to as "cooling" or may also be referred to as "cooling and storing"). When the cooling and storing operation is not carried out, the specific components that contribute toward expressing and improving ionic conductivity, such as the halogen element and the lithium element derived from, for example, lithium bromide and lithium iodide that are favorably used as the solid electrolyte raw material could not remain in the complex but separate out, therefore resulting in that the ionic conductivity of the resultant sulfide solid electrolyte lowers.

As described above, in production of the sulfide solid electrolyte, it is important that the specific components are not separated from the complex but are kept remaining therein for attaining a high ionic conductivity, and for this, in the production method of the present embodiment, the complexing agent is used. On the other hand, it has become known that even though the complexing agent is used, when the complex is kept in a slurry state, the specific components may separate with time from the complex and the ionic conductivity is thereby lowered. The condition where the complex is kept in a slurry state may occur even in production of a solid electrolyte on a laboratory level, but in mass-scale production in future, the state of keeping the complex as a slurry owing to production process control or instrument trouble may last long most probably to cause a possibility of reduction in an ionic conductivity. In the production method of the present embodiment, the complex slurry is cooled and stored so as to suppress as much as possible the separation of the specific components from the complex to thereby make it possible to attain a high ionic conductivity.

Accordingly, the production method of the present embodiment can adapt not only to production of a sulfide solid electrolyte having a higher ionic conductivity but also to a production process for a sulfide solid electrolyte where a complex slurry has been formed and then dried or heated, for example, as mentioned below within a short period of time of 12 hours or less, 6 hours or less, or 1 hour or less to thereby keep the complex as a state of a complex slurry for a long period of time, and therefore can be said to be an effective production method.

The reason why the specific components can be kept inside the complex by cooling and storing to suppress separation thereof is considered to be because the bonding force between the lithium element in the structure such as a $PS_4$ structure to bond via the hetero atom in the complexing agent and the lithium element of a lithium halide in the complex can be maintained so that the chemical stability of the aggregate via the complexing agent in the complex slurry can be kept, but the detailed mechanism thereof is not clear. If the components completely dissolve or do not dissolve at all at a predetermined temperature, there is no influence of solubility (e.g., PTL 2). However, the complex slurry in the present embodiment is in coexistence of solid and liquid, and therefore the components of the complex each having a different solubility dissolve or do not dissolve and are contained in the slurry. The solubility varies depending on temperature, and therefore it is generally so considered that the temperature of the complex slurry is preferably kept constant for maintaining the solution state of the complex slurry. Moreover, in visual observation of the complex slurry while kept as such for a long period of time, there was found no change irrespective of the presence or absence of cooling in storing. Consequently, it was difficult to find out any problem relating to chemical stability of the complex slurry. Surprisingly, however, in the production method of the present embodiment, chemical stability of the aggregate via the complexing agent in the complex slurry can be attained by simple operation of merely cooling and storing a complex slurry containing a complex formed of a predetermined element and a complexing agent, and the specific components, especially the bromine component and the lithium component derived from lithium bromide that are readily separable can be prevented from separating, and the production method can have attained a specific effect of giving a sulfide solid electrolyte having a higher ionic conductivity.

Cooling and storing may be carried out after the mixing to give the complex slurry, as shown in FIG. 3, and in the case where drying to be mentioned below is carried out, the operation of cooling and storing may be carried out before the drying. In the case where the complex is pulverized as mentioned below, the operation of cooling and storing is preferably carried out after the pulverizing. In the case where the complex slurry is heated as mentioned below, the operation of cooling and storing is preferably carried out after the pulverizing and before the heating, and in the case where the drying to be mentioned below is carried out, the operation is preferably carried out after the pulverizing and before the drying. In the case where the drying and heating is carried out as mentioned below, in general, drying is carried out first, and therefore, the operation of cooling and storing is preferably carried out after the pulverizing and before the drying. Accordingly, in the present embodiment, cooling and storing is preferably carried out after pulverizing and before drying or heating the complex slurry. By cooling and storing at such a timing, the specific components can be more efficiently retained in the complex and reduction in the ionic conductivity owing to separation of the components can be suppressed, and a sulfide solid electrolyte having a high ionic conductivity is readily obtained.

The flow of FIG. 3 shows an embodiment of transferring the complex slurry produced by mixing in a reactor to an intermediate tank equipped with a cooling device, and cooling and storing it therein.

The intermediate tank for cooling and storing may be any one, for example, as shown in FIG. 3, equipped with a cooling jacket such as a water-cooling jacket as a cooling device, around the outer wall thereof, and the medium to run through the cooling jacket may be appropriately determined depending on the intended cooling temperature.

For more uniformly cooling, as shown in FIG. 3, the intermediate tank may be equipped with a mixer (stirrer), and the mixer may be appropriately selected from various mixers exemplified hereinabove for the above-mentioned reactor.

The intermediate tank may be provided as a separate tank different from the reactor for mixing, as shown in FIG. 3, or from the viewpoint of simplifying the apparatus, or for saving time for transferring the complex slurry, the reactor for mixing may be equipped with a cooling device so as to make the reactor additionally function as a cooling means by itself in place of using any separate cooling device.

In the present embodiment, the temperature condition for cooling and storing is preferably lower room temperature (23° C.), more preferably 20° C. or lower, even more preferably 15° C. or lower, further more preferably 10° C. or lower, and the lower limit thereof is, though not specifically limited, preferably −15° C. or higher, more preferably −10° C. or higher, even more preferably −5° C. or higher, further more preferably 0° C. or higher. Under the temperature condition, the specific components can be more efficiently retained in the complex to suppress reduction in the ionic conductivity owing to separation thereof, and a sulfide solid electrolyte having a high ionic conductivity is readily produced.

The cooling and storing time may be determined depending on the time for which the complex slurry is kept as such in the production process of the sulfide solid electrolyte, but is, from the viewpoint of suppressing as much as possible separation of the specific components, preferably 0.1 hours or more, more preferably 1 hour or more, even more preferably 12 hours or more. The upper limit of the cooling and storing time is also determined depending on the time for which the complex slurry is kept as such and is therefore not specifically limited. For example, when the time is approximately 240 hours or less, an extremely excellent effect of suppressing separation of the specific components can be achieved, and from the viewpoint of improving the suppressing effect, the time is preferably 72 hours or less, more preferably 60 hours or less, even more preferably 48 hours or less, further more preferably 36 hours or less.

(Pulverization)

It is preferred that the production method for a sulfide solid electrolyte of the present embodiment further includes pulverization of the complex. By pulverizing the complex, a sulfide solid electrolyte having a small particle diameter is obtained while suppressing the lowering of the ionic conductivity.

The pulverization of the complex in the present embodiment is different from mechanical milling that is a so-called solid-phase method and is not one for obtaining an amorphous or crystalline sulfide solid electrolyte owing to a mechanical stress. As mentioned above, the complex contains the complexing agent, and the lithium-containing structure, such as a $PS_4$ structure, and the raw materials containing lithium, such as a lithium halide, are bound (coordinated) with each other via the complexing agent. Then, it may be considered that when the complex is pulverized, fine particles of the complex are obtained while maintaining the above-mentioned binding (coordination) and dispersing state.

By subjecting this complex to heat treatment, the components bound (coordinated) via the complexing agent are linked with each other at the same time of removal of the complexing agent, and the reaction with the crystalline sulfide solid electrolyte easily takes place. For that reason, growth of large particles owing to aggregation of particles with each other as seen in usual synthesis of a solid electrolyte is hardly generated, and atomization can be readily achieved.

From the viewpoint of performance and production of an all-solid-battery, it is desired that the particle diameter of the sulfide solid electrolyte is small; however, it is not easy to atomize the sulfide solid electrolyte through pulverization with a bead mill. It is possible to perform the atomization through wet pulverization using, for example, a solvent to some extent; however, the sulfide solid electrolyte is liable to be degraded with the solvent, and aggregation is liable to take place during pulverization, resulting in a problem such that an excessive load is applied for the pulverization. On the other hand, even by performing dry pulverization without using a solvent, it is difficult to achieve the atomization in a sub-micron order. Under such circumstances, the fact that the performance of the all-solid-battery can be enhanced, and the production efficiency can be enhanced through easy treatment of performing pulverization of the complex is a significant advantage.

Furthermore, since owing to agitation and mixing following the pulverization, an aggregate via the lithium-containing structure, such as a $PS_4$ structure, or the complexing agent, and an aggregate via the lithium-containing raw material, such as a lithium halide, or the complexing agent are evenly existent, whereby a complex in which the halogen element is more likely dispersed and fixed is obtained, as a result, the effect for obtaining a high ionic conductivity is readily exhibited along with the atomization.

The pulverizer which is used for pulverization of the complex is not particularly restricted so long as it is able to pulverize the particles, and for example, a medium type pulverizer using a pulverization medium can be used. Among medium type pulverizers, taking into account the fact that the complex is mainly in a slurry state principally accompanied by liquids, such as the complexing agent and the solvent, a wet-type pulverizer capable of coping with wet pulverization is preferred.

Representative examples of the wet-type pulverizer include a wet-type bead mill, a wet-type ball mill, and a wet-type vibration mill, and a wet-type bead mill using beads as a pulverization medium is preferred from the standpoint that it is able to freely adjust the condition of a pulverization operation and is easy to cope with materials having a smaller particle diameter. In addition, a dry-type pulverizer, such as a dry-type medium type pulverizer, e.g., a dry-type bead mill, a dry-type ball mill, and a dry-type vibration mill, and a dry-type non-medium pulverizer, e.g., a jet mill, can also be used.

The complex to be pulverized by the pulverizer is typically fed as a mixture prepared by mixing a solid electrolyte raw material and a complexing agent and is mainly fed in a slurry state. That is, an object to be pulverized by the pulverizer is a complex slurry mainly containing the complex. Accordingly, the pulverizer which is used in the present embodiment is preferably a flow type pulverizer capable of being optionally subjected to circulation driving of the complex slurry. More specifically, it is preferred to use a pulverizer of a mode of circulating the electrolyte precursor inclusion liquid or electrolyte precursor-containing slurry between a pulverizer (pulverization mixer) of pulverizing the slurry and a temperature-holding tank (reactor) as disclosed in JP 2010-140893 A.

The size of the bead which is used for the pulverizer may be appropriately selected according to the desired particle diameter and treatment amount, and for example, it may be about 0.05 mmϕ or more and 5.0 mmϕ or less, and it is preferably 0.1 mmϕ or more and 3.0 mmϕ or less, and more preferably 0.3 mmϕ or more and 1.5 mmϕ or less in terms of a diameter of the bead.

As the pulverizer which is used for pulverization of the complex, a machine capable of pulverizing an object using ultrasonic waves, for example, a machine called an ultrasonic pulverizer, an ultrasonic homogenizer, or a probe ultrasonic pulverizer can be used.

In this case, various conditions, such as a frequency of ultrasonic waves, may be appropriately selected according to the desired average particle diameter of the electrolyte. The frequency may be, for example, about 1 kHz or more and 100 kHz or less, and from the viewpoint of more efficiently pulverizing the complex, it is preferably 3 kHz or more and 50 kHz or less, more preferably 5 kHz or more and 40 kHz or less, and still more preferably 10 kHz or more and 30 kHz or less.

An output which the ultrasonic pulverizer has may be typically about 500 to 16,000 W, and it is preferably 600 to 10,000 W, more preferably 750 to 5,000 W, and still more preferably 900 to 1,500 W.

Although an average particle diameter ($D_{50}$) of the complex which is obtained through pulverization is appropriately determined according to the desire, it is typically 0.01 µm or more and 50 µm or less, preferably 0.03 µm or more and 5 µm or less, more preferably 0.05 µm or more and 3 µm or less. By taking such an average particle diameter, it becomes possible to cope with the desire of the complex having a small particle diameter such as 1 µm or less in terms of an average particle diameter.

A time for pulverization is typically 0.1 hours or more and 100 hours or less. From the viewpoint of efficiently regulating the particle diameter to the desired size, the time for pulverization is preferably 0.3 hours or more and 72 hours or less, more preferably 0.5 hours or more and 48 hours or less, and still more preferably 0.8 hour or more and 24 hours or less.

The pulverization may be performed at any timing so far as the complex can be pulverized, but from the viewpoint of more efficiently attaining a desired size and also from the viewpoint of more efficiently retaining the specific components in the complex to suppress reduction in ionic conductivity owing to separation thereof, thereby providing a sulfide solid electrolyte having a high ionic conductivity the pulverization is preferably carried out before cooling and storing, for example, during the above-mentioned mixing (simultaneously with the mixing), or after the mixing, more preferably after the mixing.

In the case where drying to be mentioned below is carried out, the pulverization may also be carried out after the drying. In this case, among the above-mentioned pulverizers as exemplified as the pulverizer which may be used in the present production method, any one of the dry-type pulverizers is preferably used. Besides, the items regarding the pulverization, such as a pulverization condition, are the same as those in the pulverization of the complex slurry, and the average particle diameter of the complex obtained through pulverization is also the same as that as mentioned above.

(Drying)

The production method for a sulfide solid electrolyte of the present embodiment includes a step of at least one treatment selected from drying and heating of slurry, that is, the production method includes a constitution of carrying out a treatment of drying, heating, or drying and heating. In the production method of the present embodiment, the slurry is preferably a complex slurry. Accordingly, the production method of the present embodiment preferably includes a step of carrying out at least one treatment selected from drying and heating the complex slurry.

In the case where the slurry is a complex slurry, a powder of the complex is obtained according to the constitution of at least one such treatment. For example, in the case where a crystalline sulfide solid electrolyte is obtained, preferably the heating to be mentioned below is carried out, but in the case, by previously drying, the heating can be attained efficiently. The drying and the subsequent heating can be carried out in one and the same step.

Not specifically limited, any drying device can be used. For example, a hot plate, a vacuum heating and drying apparatus, an argon gas atmosphere furnace, or a firing furnace can be used, and for industrial application, a horizontal dryer equipped with a heating means and a feed mechanism, or a horizontal vibration fluid dryer can be used.

The complex slurry can be dried at a temperature according to the kind of the remaining complexing agent (complexing agent not incorporated into the complex). For example, the drying can be performed at a temperature of a boiling point of the complexing agent or higher. In addition, the drying can be performed through drying under reduced pressure (vacuum drying) by using a vacuum pump at typically 5 to 100° C., preferably 10 to 85° C., more preferably 15 to 70° C., and still more preferably around room temperature (23° C.) (for example, (room temperature) ±about 5° C.), to volatilize the complexing agent.

The drying may be performed by subjecting the complex slurry to solid-liquid separation by means of filtration with a glass filter, or decantation, or solid-liquid separation with a centrifuge. In the present embodiment, after performing the solid-liquid separation, the drying may be performed under the above-mentioned temperature condition.

Specifically, for the solid-liquid separation, decantation in which the complex slurry is transferred into a container, and after the electrolyte precursor is precipitated, the complexing agent and solvent as a supernatant are removed, or filtration with a glass filter having a pore size of, for example, about 10 to 200 µm, and preferably 20 to 150 µm, is easy.

(Heating)

The production method for a sulfide solid electrolyte of the present embodiment can include heating the complex. Regarding heating, the complex slurry may be heated, or in the case where the above-mentioned drying is carried out, a powder of the complex may be heated. As the case may be, the complex may be one pulverized according to the above-mentioned pulverization.

By heating the complex, the complexing agent in the complex can be removed to give an amorphous sulfide solid electrolyte containing a lithium element, a sulfur element, a phosphorus element and a halogen element, or even further a crystalline sulfide solid electrolyte.

Here, the fact that the complexing agent in the complex is removed is supported by the facts that in addition to the fact that it is evident from the results of the X-ray diffraction pattern, the gas chromatography analysis that the complexing agent constitutes the complex, the sulfide solid electrolyte obtained by removing the complexing agent through heating of the complex is identical in the X-ray diffraction pattern with the solid electrolyte obtained by the conventional method without using the complexing agent.

In the production method of the present embodiment, the sulfide solid electrolyte is obtained by heating the complex to remove the complexing agent in the complex, and it is preferred that the content of the complexing agent in the complex is low as far as possible. However, the complexing agent may be contained to an extent that the performance of the solid electrolyte is not impaired. The content of the complexing agent in the sulfide solid electrolyte may be typically 10% by mass or less, and it is preferably 5% by mass or less, more preferably 3% by mass or less, and still more preferably 1% by mass or less.

In the production method of the present embodiment, in order to obtain the crystalline sulfide solid electrolyte, it may be directly obtained by heating the complex, or it may be obtained by heating the complex to give the amorphous sulfide solid electrolyte and then heating the amorphous sulfide solid electrolyte. That is, in the production method of the present embodiment, the amorphous sulfide solid electrolyte can also be produced.

Conventionally, in order to obtain a crystalline solid electrolyte having a high ionic conductivity, for example, a solid electrolyte having a thio-LISICON Region II-type crystal structure as mentioned later, it was required that an amorphous solid electrolyte is prepared through mechanical pulverization treatment, such as mechanical milling, or other melt quenching treatment, and then, the amorphous solid electrolyte is heated. But, it may be said that the production method of the present embodiment is superior to the conventional production method by mechanical milling treatment from the standpoint that a crystalline solid electrolyte having a thio-LISICON Region II-type crystal structure is obtained even by a method of not performing mechanical pulverization treatment, other melt quenching treatment.

In the production method of the present embodiment, whether or not the amorphous sulfide solid electrolyte is obtained, whether or not the crystalline sulfide solid electrolyte is obtained, whether or not after obtaining the amorphous sulfide solid electrolyte, the crystalline sulfide solid electrolyte is obtained, or whether or not the crystalline sulfide solid electrolyte is obtained directly from the complex is appropriately selected according to the desire, and is able to be adjusted by the heating temperature, the heating time, and the like.

For example, in the case of obtaining the amorphous sulfide solid electrolyte, the heating temperature of the complex may be determined according to the structure of the crystalline sulfide solid electrolyte which is obtained by heating the amorphous sulfide solid electrolyte (or the complex). Specifically, the heating temperature may be determined by subjecting the amorphous sulfide solid electrolyte (or the complex) to differential thermal analysis (DTA) with a differential thermal analysis device (DTA device) under a temperature rise condition of 10° C./min and adjusting the temperature to a range of preferably 5° C. or lower, more preferably 10° C. or lower, and still more preferably 20° C. or lower starting from a peak top temperature of the exothermic peak detected on the lowermost temperature side. Although a lower limit thereof is not particularly restricted, it may be set to a temperature of about [(peak top temperature of the exothermic peak detected on the lowermost temperature side)−40° C.] or higher. By regulating the heating temperature to such a temperature range, the amorphous sulfide solid electrolyte is obtained more efficiently and surely. Although the heating temperature for obtaining the amorphous sulfide solid electrolyte cannot be unequivocally prescribed because it varies with the structure of the resulting crystalline sulfide solid electrolyte, in general, it is preferably 135° C. or lower, more preferably 130° C. or lower, and still more preferably 125° C. or lower. Although a lower limit of the heating temperature is not particularly limited, it is preferably 90° C. or higher, more preferably 100° C. or higher, and still more preferably 110° C. or higher.

In the case of obtaining the crystalline sulfide solid electrolyte by heating the amorphous sulfide solid electrolyte or directly from the complex, the heating temperature may be determined according to the structure of the crystalline sulfide solid electrolyte, and it is preferably higher than the above-mentioned heating temperature for obtaining the amorphous sulfide solid electrolyte. Specifically, the heating temperature may be determined by subjecting the amorphous sulfide solid electrolyte (or the complex) to differential thermal analysis (DTA) with a differential thermal analysis device (DTA device) under a temperature rise condition of 10° C./min and adjusting the temperature to a range of preferably 5° C. or higher, more preferably 10° C. or higher, and still more preferably 20° C. or higher starting from a peak top temperature of the exothermic peak (hereinunder the temperature may be referred to as "crystallization temperature") detected on the lowermost temperature side. Although an upper limit thereof is not particularly restricted, it may be set to a temperature of about [(peak top temperature of the exothermic peak detected on the lowermost temperature side)+40° C.] or lower. By regulating the heating temperature to such a temperature range, the crystalline sulfide solid electrolyte is obtained more efficiently and surely. Although the heating temperature for obtaining the crystalline sulfide solid electrolyte cannot be unequivocally prescribed because it varies with the structure of the resulting crystalline sulfide solid electrolyte, in general, it is preferably 130° C. or higher, more preferably 135° C. or higher, and still more preferably 140° C. or lower. Although an upper limit of the heating temperature is not particularly limited, it is preferably 300° C. or lower, more preferably 280° C. or lower, and still more preferably 250° C. or lower.

Although the heating time is not particularly limited so long as it is a time for which the desired amorphous sulfide solid electrolyte or crystalline sulfide solid electrolyte is obtained, for example, it is preferably 1 minute or more, more preferably 10 minutes or more, still more preferably 30 minutes or more, and yet still more preferably 1 hour or more. In addition, though an upper limit of the heating time is not particularly restricted, it is preferably 24 hours or less, more preferably 10 hours or less, still more preferably 5 hours or less, and yet still more preferably 3 hours or less.

It is preferred that the heating is performed in an inert gas atmosphere (for example, a nitrogen atmosphere and an argon atmosphere) or in a reduced pressure atmosphere (especially, in vacuum). This is because deterioration (for example, oxidation) of the crystalline sulfide solid electrolyte can be prevented from occurring. Although a method for heating is not particularly limited, for example, a method of using a hot plate, a vacuum heating device, an argon gas atmosphere furnace, or a firing furnace can be adopted. In addition, industrially, a lateral dryer or a lateral vibration fluid dryer provided with a heating means and a feed mechanism may be selected according to the heating treatment amount.

(Amorphous Sulfide Solid Electrolyte)

The amorphous sulfide solid electrolyte which is obtained by the production method for a sulfide solid electrolyte of the present embodiment contains the lithium element, the sulfur element, the phosphorus element, and the halogen element. As representative examples thereof, there are preferably exemplified solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr; and solid electrolytes further containing other element, such as an oxygen element and a silicon element, for example, $Li_2S$—$P_2S_5$—$Li_2O$—LiI and $Li_2S$—$SiS_2$—$P_2S_5$—LiI. From the viewpoint of obtaining a higher ionic conductivity, solid electrolytes constituted of lithium sulfide, phosphorus sulfide, and a lithium halide, such as $Li_2S$—$P_2S_5$—LiI, $Li_2S$—$P_2S_5$—LiCl, $Li_2S$—$P_2S_5$—LiBr, and $Li_2S$—$P_2S_5$—LiI—LiBr, are preferred.

The kinds of the elements constituting the amorphous sulfide solid electrolyte can be confirmed by, for example, an inductivity coupled plasma optical emission spectrometer (ICP).

In the case where the amorphous sulfide solid electrolyte obtained in the production method of the present embodiment is one having at least $Li_2S$—$P_2S_5$, from the viewpoint of obtaining a higher ionic conductivity, a molar ratio of $Li_2S$ to $P_2S_5$ is preferably (65 to 85)/(15 to 35), more preferably (70 to 80)/(20 to 30), and still more preferably (72 to 78)/(22 to 28).

In the case where the amorphous sulfide solid electrolyte obtained in the production method for a solid electrolyte of the present embodiment is $Li_2S$—$P_2S_5$—LiI—LiBr, the total content of lithium sulfide and phosphorus pentasulfide is preferably 60 to 95 mol %, more preferably 65 to 90 mol %, and still more preferably 70 to 85 mol %. In addition, a proportion of lithium bromide relative to the total of lithium bromide and lithium iodide is preferably 1 to 99 mol %, more preferably 20 to 90 mol %, still more preferably 40 to 80 mol %, and especially preferably 45 to 65 mol %.

In the amorphous sulfide solid electrolyte obtained in the production method of the present embodiment, a blending ratio (molar ratio) of lithium element to sulfur element to phosphorous element to halogen atom is preferably (1.0 to 1.8)/(1.0 to 2.0)/(0.1 to 0.8)/(0.01 to 0.6), more preferably (1.1 to 1.7)/(1.2 to 1.8)/(0.2 to 0.6)/(0.05 to 0.5), and still more preferably (1.2 to 1.6)/(1.3 to 1.7)/(0.25 to 0.5)/(0.08 to 0.4). In addition, in the case of using a combination of bromine and iodine as the halogen element, a blending ratio (molar ratio) of lithium element to sulfur element to phosphorus element to bromine to iodine is preferably (1.0 to 1.8)/(1.0 to 2.0)/(0.1 to 0.8)/(0.01 to 3.0)/(0.01 to 0.3), more preferably (1.1 to 1.7)/(1.2 to 1.8)/(0.2 to 0.6)/(0.02 to 0.25)/(0.02 to 0.25), still more preferably (1.2 to 1.6)/(1.3 to 1.7)/(0.25 to 0.5)/(0.03 to 0.2)/(0.03 to 0.2), and yet still more preferably (1.35 to 1.45)/(1.4 to 1.7)/(0.3 to 0.45)/(0.04 to 0.18)/(0.04 to 0.18). By allowing the blending ratio (molar ratio) of lithium element to sulfur element to phosphorus element to halogen element to fall within the above-mentioned range, it becomes easy to provide a solid sulfide electrolyte having a thio-LISICON Region II-type crystal structure and having a higher ionic conductivity.

Although the shape of the amorphous sulfide solid electrolyte is not particularly restricted, examples thereof include a granular shape. The average particle diameter ($D_{50}$) of the granular amorphous sulfide solid electrolyte is, for example, within a range of 0.01 to 500 μm, and preferably 0.1 to 200 μm.

(Crystalline Solid Electrolyte)

The crystalline sulfide solid electrolyte obtained by the production method for a sulfide solid electrolyte of the present embodiment may be a so-called glass ceramics which is obtained by heating the amorphous sulfide solid electrolyte to a crystallization temperature or higher. Examples of a crystal structure thereof include an $Li_3PS_4$ crystal structure, an $Li_4P_2S_6$ crystal structure, an $Li_7PS_6$ crystal structure, an $Li_7P_3S_{11}$ crystal structure, and a crystal structure having peaks at around of $2\theta=20.2°$ and $23.6°$ (see, for example, JP 2013-16423 A).

In addition, examples thereof include an $Li_{4-x}Ge_{1-x}P_xS_4$-based thio-LISICON Region II-type crystal structure (see Kanno, et al., Journal of The Electrochemical Society, 148 (7) A742-746 (2001)) and a crystal structure similar to the $Li_{4-x}Ge_{1-x}P_xS_4$-based thio-LISICON Region II-type crystal structure (see Solid State Ionics, 177 (2006), 2721-2725).

Among them, the thio-LISICON Region II-type crystal structure is preferred as the crystal structure of the crystalline sulfide solid electrolyte obtained by the production method of the present embodiment from the standpoint that a higher ionic conductivity is obtained. Here, the "thio-LISICON Region II-type crystal structure" expresses any one of an $Li_{4-x}Ge_{1-x}P_xS_4$-based thio-LISICON Region II-type crystal structure and a crystal structure similar to the $Li_{4-x}Ge_{1-x}P_xS_4$-based thio-LISICON Region II-type crystal structure. In addition, though the crystalline sulfide solid electrolyte obtained by the production method of the present embodiment may be one having the above-mentioned thio-LISICON Region II-type crystal structure or may be one having the thio-LISICON Region II-type crystal structure as a main crystal, it is preferably one having the thio-LISICON Region II-type crystal structure as a main crystal. In this specification, the wording "having as a main crystal" means that a proportion of the crystal structure serving as an object in the crystal structure is 80% or more, and it is preferably 90% or more, and more preferably 95% or more. In addition, from the viewpoint of obtaining a higher ionic conductivity, the crystalline sulfide solid electrolyte obtained by the production method of the present embodiment is preferably one not containing crystalline $Li_3PS_4$ ($\beta$-$Li_3PS_4$).

In the X-ray diffractometry using a CuKα ray, the $Li_3PS_4$ crystal structure gives diffraction peaks, for example, at around $2\theta=17.5°$, $18.3°$, $26.1°$, $27.3°$, and $30.0°$; the $Li_4P_2S_6$ crystal structure gives diffraction peaks, for example, at around $2\theta=16.9°$, $27.1°$, and $32.5°$; the $Li_7PS_6$ crystal structure gives diffraction peaks, for example, at around $2\theta=15.3°$, $25.2°$, $29.6°$, and $31.0°$; the $Li_7P_3S_{11}$ crystal structure gives diffraction peaks, for example, at around $2\theta=17.8°$, $18.5°$, $19.7°$, $21.8°$, $23.7°$, $25.9°$, $29.6°$, and $30.0°$; the $Li_{4-x}Ge_{1-x}P_xS_4$-based thio-LISICON Region II-type crystal structure gives diffraction peaks, for example, at around $2\theta=20.1°$, $23.9°$, and $29.5°$; and the crystal structure similar to the $Li_{4-x}Ge_{1-x}P_xS_4$-based thio-LISICON Region II-type crystal structure gives diffraction peaks, for example, at around $2\theta=20.2°$ and $23.6°$.

As mentioned above, in the case when the thio-LISICON Region II-type crystal structure is obtained in the present embodiment, the foregoing crystal structure is preferably one not containing crystalline $Li_3PS_4$ ($\beta$-$Li_3PS_4$). FIG. 4 shows an X-ray diffractometry example of the crystalline sulfide solid electrolyte obtained by the production method of the present embodiment. In addition, FIG. 5 shows an X-ray diffractometry example of crystalline $Li_3PS_4$ ($\beta$-$Li_3PS_4$). As grasped from FIGS. 4 and 5, the sulfide solid electrolyte obtained according to the production method of the present embodiment does not have diffraction peaks at $2\theta=17.5°$ and $26.1°$, or even in the case where it has diffraction patterns, extremely small peaks as compared with the diffraction peaks of the thio-LISICON Region II-type crystal structure are merely detected.

The crystal structure represented by a compositional formula $Li_{7-x}P_{1-y}Si_yS_6$ or $Li_{7+x}P_{1-y}Si_yS_6$ (x is −0.6 to 0.6, and y is 0.1 to 0.6), which has the above-mentioned structure skeleton of $Li_7PS_6$ and in which a part of P is substituted with Si, is a cubic crystal or a rhombic crystal, and is preferably a cubic crystal, and in X-ray diffractometry using a CuKα ray, the crystal structure gives peaks appearing mainly at $2\theta=15.5°$, $18.0°$, $25.0°$, $30.0°$, $31.4°$, $45.3°$, $47.0°$, and $52.0°$. The crystal structure represented by the above-mentioned compositional formula $Li_{7-x-2y}PS_{6-x-y}Cl_x$ ($0.8 \leq x \leq 1.7$, and $0 < y \leq (-0.25x+0.5)$) is preferably a cubic crystal, and in the X-ray diffractometry using a CuKα ray, the crystal structure gives peaks appearing mainly at $2\theta=15.5°$, $18.0°$, $25.0°$, $30.0°$, $31.4°$, $45.3°$, $47.0°$, and $52.0°$. The crystal structure represented by the above-mentioned compositional formula $Li_{7-x}PS_{6-x}Ha_x$ (Ha represents Cl or Br, and x is preferably 0.2 to 1.8) is preferably a cubic crystal, and in the X-ray diffractometry using a CuKα ray, the crystal structure gives peaks appearing mainly at $2\theta=15.5°, 18.0°, 25.0°, 30.0°, 31.4°, 45.3°, 47.0°$, and $52.0°$.

These peak positions of the crystal structure may vary within a range of $\pm 1.0°$.

Although the shape of the crystalline sulfide solid electrolyte is not particularly restricted, examples thereof include a granular shape. The average particle diameter ($D_{50}$) of the granular crystalline sulfide solid electrolyte is, for example, within a range of 0.01 to 500 µm, and preferably 0.1 to 200 µm.

Embodiment B

Next, the Embodiment B is described.

The Embodiment B is concerned with a mode in which in the production method of the present embodiment including mixing a solid electrolyte raw material containing a lithium element, a sulfur element, a phosphorus element, and a halogen element with a complexing agent, a solid electrolyte raw material containing a solid electrolyte such as $Li_3PS_4$, for example, preferably amorphous $Li_3PS_4$ or crystalline $Li_3PS_4$, and a complexing agent are used. In the Embodiment A, the complex is formed while synthesizing the lithium-containing structure, such as $Li_3PS_4$, existent as a main structure in the solid electrolyte obtained by the production method of the present embodiment, through reaction among the raw materials, such as lithium sulfide, and therefore, it may be considered that a constitution ratio of the above-mentioned structure is liable to become small.

Then, in the Embodiment B, a solid electrolyte containing the above-mentioned structure is previously prepared by means of production, and this is used as the solid electrolyte raw material. According to this, a complex in which the above-mentioned structure used as a solid electrolyte raw material and the raw material containing lithium, such the lithium halide, are bound (coordinated) with each other via the complexing agent, and the halogen element is dispersed and fixed is more likely obtained. As a result, a sulfide solid electrolyte having a high ionic conductivity can be obtained. In addition, as a collateral effect, generation of hydrogen sulfide can be suppressed.

Examples of the solid electrolyte raw material containing a lithium element, a sulfur element, and a phosphorus element, which may be used in the Embodiment B, include an amorphous solid electrolyte or crystalline solid electrolyte having a $PS_4$ structure as a molecular structure, and from the viewpoint of attaining a higher ionic conductivity, amorphous $Li_3PS_4$ or crystalline $Li_3PS_4$ is preferred. In consideration of suppressing generation of hydrosulfide, an amorphous solid electrolyte or a crystalline solid electrolyte not containing a $P_2S_7$ structure is preferred. As such a solid electrolyte, ones produced by a conventionally existing production method, such as a mechanical milling method, a slurry method, and a melt quenching method, can be used, and commercially available products can also be used.

In this case, the solid electrolyte containing a lithium element, a sulfur element, and a phosphorus element is preferably an amorphous electrolyte. The dispersibility of the halogen element in the complex is enhanced, and the halogen element is easily bound with the lithium element, the sulfur element, and the phosphorus element in the solid electrolyte, and as a result, a sulfide solid electrolyte having a higher ionic conductivity can be obtained.

In the embodiment B, the content of the amorphous electrolyte having a $PS_4$ structure is preferably 60 to 100 mol %, more preferably 65 to 90 mol %, and still more preferably 70 to 80 mol % relative to the total of the solid electrolyte raw material.

In the case of using the amorphous electrolyte having a $PS_4$ structure and the halogen simple substance, the content of the halogen simple substance is preferably 1 to 50 mol %, more preferably 2 to 40 mol %, still more preferably 3 to 25 mol %, and yet still more preferably 3 to 15 mol % relative to the amorphous electrolyte having a $PS_4$ structure.

Besides, in the case of using the halogen simple substance and the lithium halide and the case of using the two halogen simple substances, the same as in the Embodiment A is applicable.

In the Embodiment B, in all other cases than the raw materials, for example, the complexing agent, the mixing, the cooling and storing, the drying, the heating, the amorphous solid electrolyte, and the crystalline solid electrolyte are the same as those described in the Embodiment A.

In the Embodiment B, the matter that what the complex is pulverized is preferred, the pulverizer to be used for pulverization, the matter that after mixing or after drying, the pulverization may be performed, various conditions regarding pulverization, and so on are also the same as those in the Embodiment A.

Embodiments C and D

As shown in the flow chart of FIG. 2, the Embodiments C and D are different from the Embodiments A and B, respectively from the standpoint that a solvent is added to the solid electrolyte raw material and the complexing agent. The Embodiments C and D are concerned with a heterogeneous method of solid-liquid coexistence, whereas in the Embodiments A and B, the electrolyte precursor that is a solid is formed in the complexing agent that is a liquid. At this time, when the complex is easily soluble in the complexing agent, there is a case where separation of the components is generated. In the Embodiments C and D, by using a solvent in which the complex is insoluble, elution of the components in the complex can be suppressed.

(Solvent)

In the production method for a sulfide solid electrolyte of the Embodiments C and D, a solvent not dissolving the complex is added to the solid electrolyte raw material and the complexing agent, and the solid electrolyte raw material and the complexing agent are mixed with the solvent not dissolving the complex. In view of the fact that the solid electrolyte raw material and the complexing agent are mixed using the solvent, an effect to be brought by using the complexing agent, namely an effect in which formation of the complex having reacted with the lithium element, the sulfur element, the phosphorus element, and the halogen element is promoted, an aggregate via the lithium-containing structure, such as a $PS_4$ structure, or the complexing agent, and an aggregate via the lithium-containing raw material, such as a lithium halide, or the complexing agent are evenly existent, whereby a complex in which the halogen element is more likely dispersed and fixed is obtained, as a result, an effect for obtaining a high ionic conductivity is easily exhibited.

The production method of the present embodiment is a so-called heterogeneous method, and it is preferred that the complex is not completely dissolved in the complexing agent that is a liquid but deposited. In the Embodiments C and D, by adding the solvent, the solubility of the complex can be adjusted. In particular, the halogen element is liable to separate from the complex, and therefore, by adding the solvent, the separation of the halogen element is suppressed, whereby the desired complex is obtained. As a result, a crystalline sulfide solid electrolyte having a high ionic conductivity can be obtained via the complex in which the components, such as a halogen, are dispersed.

As the solvent having such properties, a solvent having a solubility parameter of 10 or less is preferably exemplified. In this specification, the solubility parameter is described in various literatures, for example, "Handbook of Chemistry" (published in 2004, Revised 5th Edition, by Maruzen Publishing Co., Ltd.) and is a value δ ((cal/cm$^3$)$^{1/2}$) calculated according to the following numerical formula (1), which is also called a Hildebrand parameter, SP value.

$$\delta=\sqrt{(\Delta H-RT)/V} \quad (1)$$

In the numerical formula (1), ΔH is a molar heating value; R is a gas constant; T is a temperature; and V is a molar volume.

By using the solvent having a solubility parameter of 10 or less, the solvent has such properties that as compared by the above-mentioned complexing agent, it relatively hardly dissolves the halogen element, the solid electrolyte raw material containing a halogen element, such as a lithium halide, and further the halogen element-containing component constituting the complex (for example, an aggregate in which lithium halide and the complexing agent are bound with each other); it is easy to fix the halogen element within the complex; the halogen element is existent in a favorable state in the resulting complex and further the sulfide solid electrolyte; and a sulfide solid electrolyte having a high ionic conductivity is readily obtained. That is, it is preferred that the solvent which is used in the present embodiment has such properties that it does not dissolve the complex. From the same viewpoint, the solubility parameter of the solvent is preferably 9.5 or less, more preferably 9.0 or less, and still more preferably 8.5 or less.

More specifically, as the solvent which is used in the production method of the Embodiments C and D, it is possible to broadly adopt a solvent which has hitherto been used in the production of a solid electrolyte. Examples thereof include hydrocarbon solvents, such as an aliphatic hydrocarbon solvent, an alicyclic hydrocarbon solvent, and an aromatic hydrocarbon solvent; and carbon atom-containing solvents, such as an alcohol-based solvent, an ester-based solvent, an aldehyde-based solvent, a ketone-based solvent, an ether-based solvent, and a solvent containing a carbon atom and a hetero atom. Of these, preferably, a solvent having a solubility parameter falling within the above-mentioned range may be appropriately selected and used.

More specifically, examples of the solvent include an aliphatic hydrocarbon solvent, such as hexane (7.3), pentane (7.0), 2-ethylhexane, heptane (7.4), octane (7.5), decane, undecane, dodecane, and tridecane; an alicyclic hydrocarbon solvent, such as cyclohexane (8.2) and methylcyclohexane; an aromatic hydrocarbon solvent, such as benzene, toluene (8.8), xylene (8.8), mesitylene, ethylbenzene (8.8), tert-butylbenzene, trifluoromethylbenzene, nitrobenzene, chlorobenzene (9.5), chlorotoluene (8.8), and bromobenzene; an alcohol-based solvent, such as ethanol (12.7) and butanol (11.4); an ester-based solvent, such as ethyl acetate (9.1) and butyl acetate (8.5); an aldehyde-based solvent, such as formaldehyde, acetaldehyde (10.3), and dimethylformamide (12.1); a ketone-based solvent, such as acetone (9.9) and methyl ethyl ketone; an ether-based solvent, such as diethyl ether (7.4), diisopropyl ether (6.9), dibutyl ether, tetrahydrofuran (9.1), dimethoxyethane (7.3), cyclopentylmethyl ether (8.4), tert-butylmethyl ether, and anisole; and a solvent containing a carbon atom and a hetero atom, such as acetonitrile (11.9), dimethyl sulfoxide, and carbon disulfide. The numerical values within the parentheses in the above-mentioned exemplifications are an SP value.

Of these solvents, an aliphatic hydrocarbon solvent, an alicyclic hydrocarbon solvent, an aromatic hydrocarbon solvent, and an ether-based solvent are preferred; from the viewpoint of obtaining a higher ionic conductivity more stably, heptane, cyclohexane, methylcyclohexane, toluene, ethylbenzene, diethyl ether, diisopropyl ether, dibutyl ether, dimethoxyethane, cyclopentylmethyl ether, tert-butylmethyl ether, and anisole are more preferred; methylcyclohexane, diethyl ether, diisopropyl ether, and dibutyl ether are still more preferred; methylcyclohexane, diisopropyl ether and dibutyl ether are yet still more preferred; and methylcyclohexane is especially preferred. The solvent which is used in the present embodiment is preferably the organic solvent as exemplified above and is an organic solvent different from the above-mentioned complexing agent. In the present embodiment, these solvents may be used alone or in combination of plural kinds thereof.

In the case of using the solvent, the content of the raw materials in the raw material inclusion may be regulated to one relative to one liter of the total amount of the complexing agent and the solvent.

As for drying in the Embodiments C and D, the complex slurry can be dried at a temperature according to the kind of each of the remaining complexing agent (complexing agent not incorporated into the complex) and the solvent. For example, the drying can be performed at a temperature of a boiling point of the complexing agent or solvent or higher. In addition, the drying can be performed through drying under reduced pressure (vacuum drying) by using a vacuum pump at typically 5 to 100° C., preferably 10 to 85° C., more preferably 15 to 70° C., and still more preferably around room temperature (23° C.) (for example, (room temperature) ±about 5° C.), to volatilize the complexing agent and the solvent. In addition, in the heating in the Embodiments C and D, in the case where the solvent remains in the electrolyte precursor, the solvent is also removed.

However, different from the complexing agent constituting the complex, the solvent hardly constitutes the complex. In consequence, the content of the solvent which may remain in the complex is typically 3% by mass or less, preferably 2% by mass or less, and more preferably 1% by mass or less.

In the Embodiment C, in all other cases than the solvent, for example, the complexing agent, the mixing, the cooling and storing, the drying, the heating, the amorphous solid electrolyte, and the crystalline solid elements are the same as those described in the Embodiment A. In addition, in the Embodiment D, all other cases than the solvent are the same as those described in the Embodiment B.

In the Embodiments C and D, the matter that what the complex is pulverized is preferred, the pulverizer to be used for pulverization, the matter that after mixing or after drying, the pulverization may be performed, various conditions regarding pulverization, and so on are also the same as those in the Embodiment A.

The sulfide solid electrolyte which is obtained by the production method of the present embodiment has a high ionic conductivity and also has an excellent battery performance, so that it is suitably used for batteries. In the case of adopting a lithium element as the conduction species, such is especially suitable. The sulfide solid electrolyte obtained by the production method of the present embodiment may be used for a positive electrode layer, may be used for a negative electrode layer, or may be used for an electrolyte layer. Each of the layers can be produced by a known method.

(Positive Electrode Mixture, Negative Electrode Mixture)

For example, in the case of using the sulfide solid electrolyte for the positive electrode layer or the negative electrode layer, by dispersing a positive electrode active material or a negative electrode active material in a complex slurry, mixing them, and drying, the complex is attached onto the active material surface. Furthermore, similar to the above-mentioned embodiment, by heating the complex, it becomes an amorphous sulfide solid electrolyte or crystalline sulfide solid electrolyte. At this time, by heating together with the active material, the positive electrode mixture or negative electrode mixture having the sulfide solid electrolyte attached onto the active material surface is obtained.

As the positive electrode active material, any material can be used without particular restrictions so far as it may promote a battery chemical reaction accompanied by transfer of a lithium ion caused due to the lithium element to be preferably adopted as an element capable of revealing the ionic conductivity in the present embodiment in relation to the negative electrode active material. Examples of such a positive electrode active material in and from which a lithium ion can be inserted and released include an oxide-based positive electrode active material and a sulfide-based positive electrode active material.

Preferably, examples of the oxide-based positive electrode active material include lithium-containing transition metal complex oxides, such as LMO (lithium manganate), LCO (lithium cobaltate), NMC (lithium nickel manganese cobaltate), NCA (lithium nickel cobalt aluminate), LNCO (lithium nickel cobaltate), and an olivine type compound ($LiMeNPO_4$: Me=Fe, Co, Ni, or Mn).

Examples of the sulfide-based positive electrode active material include titanium sulfide ($TiS_2$), molybdenum sulfide ($MoS_2$), iron sulfide ($FeS$ and $FeS_2$), copper sulfide ($CuS$), and nickel sulfide ($Ni_3S_2$).

Besides the above-mentioned positive electrode active materials, niobium selenide ($NbSe_3$) and so on can also be used.

In the present embodiment, the positive electrode active material can be used alone or in combination of plural kinds thereof.

As the negative electrode active material, any material can be used without particular restrictions so long as it may promote a battery chemical reaction accompanied by transfer of a lithium ion caused preferably due to the lithium element, such as an element which is preferably adopted as an element revealing the ionic conductivity in the present embodiment, and preferably a metal capable of forming an alloy together with the lithium element, an oxide thereof, and an alloy of the foregoing metal and the lithium element. As such a negative electrode active material in and from which a lithium ion can be inserted and released, any material which is known as the negative electrode material in the battery field can be adopted without restrictions.

Examples of such a negative active material include metallic lithium or a metal capable of forming an alloy together with metallic lithium, such as metallic lithium, metallic indium, metallic aluminum, metallic silicon, and metallic tin; an oxide of such a metal; and an alloy of such a metal and metallic lithium.

The electrode active material which is used in the present embodiment may also be one having a coating layer whose surface is coated.

Examples of the material which forms the coating layer include ionic conductors, such as nitrides or oxides of an element revealing the ionic conductivity in the crystalline sulfide solid electrolyte to be used in the present embodiment, preferably a lithium element, or complexes thereof. Specifically, examples thereof include lithium nitride ($Li_3N$); a conductor having a lisicon type crystal structure composed of, as a main structure, $Li_4GeO_4$, for example, $Li_{4-2x}Zn_xGeO_4$; a conductor having an $Li_3PO_4$ type skeleton structure, for example, a thiolisicon type crystal structure, such as $Li_{4-x}Ge_{1-x}P_xS_4$; a conductor having a perovskite type crystal structure, such as $La_{2/3-x}Li_{3x}TiO_3$; and a conductor having an NASICON type crystal structure, such as $LiTi_2(PO_4)_3$.

In addition, examples thereof include lithium titanates, such as $Li_yTi_{3-y}O_4$ ($0<y<3$) and $Li_4Ti_5O_{12}$ (LTO); lithium metallates of a metal belonging to the Group 5 of the periodic table, such as $LiNbO_3$ and $LiTaO_3$; and oxide-based conductors, such as $Li_2O$—$B_2O_3$—$P_2O_5$-based, $Li_2O$—$B_2O_3$—ZnO-based, and $Li_2O$—$Al_2O_3$—$SiO_2$—$P_2O_5$—$TiO_2$-based materials.

The electrode active material having a coating layer is, for example, obtained by attaching a solution containing various elements constituting a material for forming the coating layer onto the surface of the electrode active material and burning the electrode active material after attachment preferably at 200° C. or higher and 400° C. or lower.

Here, as the solution containing various elements, a solution containing an alkoxide of a metal of every sort, such as lithium ethoxide, titanium isopropoxide, niobium isopropoxide, and tantalum isopropoxide, may be used. In this case, as the solvent, an alcohol-based solvent, such as ethanol and butanol; an aliphatic hydrocarbon solvent, such as hexane, heptane, and octane; an aromatic hydrocarbon solvent, such as benzene, toluene, and xylene; and so on may be used.

The above-mentioned attachment may be performed through dipping, spray coating.

From the viewpoint of enhancing the production efficiency and the battery performance, a burning temperature is preferably 200° C. or higher and 400° C. or lower as mentioned above, and more preferably 250° C. or higher and 390° C. or lower, and a burning time is typically about 1 minute to 10 hours, and preferably 10 minutes to 4 hours.

A coverage of the coating layer on a basis of a surface area of the electrode active material is preferably 90% or more, more preferably 95% or more, and still more preferably 100%, namely it is preferred that the entire surface is coated. In addition, a thickness of the coating layer is preferably 1 nm or more, and more preferably 2 nm or more, and an upper limit thereof is preferably 30 nm or less, and more preferably 25 nm or less.

The thickness of the coating layer can be measured through cross-sectional observation with a transmission electron microscope (TEM), and the coverage can be calculated from the thickness, the elemental analysis value, and the BET surface area of the coating layer.

The above-mentioned battery preferably uses a collector in addition to the positive electrode layer, the electrolyte layer, and the negative electrode layer, and the collector can be any known one. For example, a layer formed by coating Au, Pt, Al, Ti or Cu capable of reacting with the above-mentioned solid electrolyte, with Au can be used.

EXAMPLES

Next, the present invention is described specifically with reference to Examples, but it should be construed that the present invention is by no means restricted by these Examples.

Reference Example 1

Into a one-liter impeller-provided reaction tank, 13.19 g of lithium sulfide, 21.26 g of diphosphorus pentasulfide, 4.15 g of lithium bromide and 6.40 g of lithium iodide were put in a nitrogen atmosphere. As a complexing agent, 100 mL of tetramethylethylenediamine (TMEDA) and, as a solvent, 800 mL of methylcyclohexane were added thereto, and mixed with stirring by driving the impeller. 456 g of zirconia balls (diameter: 0.5 mmϕ) were put into a cycle-operable bead mill ("Star Mill LMZ015 (model number)", by Ashizawa Finetech Ltd.) in which the bead filling rate relative to the pulverizing room was 80%, and while the system was circulated between the reaction tank and the pulverizing room at a pump flow rate of 550 mL/min, at a peripheral speed of 8 m/s and at a mill jacket temperature of 20° C., the materials were pulverized for 60 minutes to give a complex slurry.

Next, the resultant complex slurry was immediately dried at room temperature (23° C.) in vacuum to give a powdery complex. Next, the powdery complex was heated at 120° C. in vacuum for 2 hours to give an amorphous solid electrolyte. Further, the amorphous solid electrolyte was heated at 200° C. in vacuum for 2 hours to give a crystalline solid electrolyte.

The crystalline sulfide solid electrolyte obtained in Reference Example 1 was analyzed through powdery X-ray diffractometry (XRD) using an X-ray diffractometer (XRD) ("D2 Phaser (trade name)" by Bruker Japan K.R.). The X-ray diffraction spectrum thereof is shown in FIG. 4. In addition, the complex and the amorphous sulfide solid electrolyte obtained in Reference Example 1 were also analyzed through powdery X-ray diffractometry (XRD) in the same manner as above, and the X-ray diffraction spectra thereof are shown in FIG. 6 along with the X-ray diffraction spectrum of the crystalline sulfide solid electrolyte therein. As known from FIGS. 4 and 6, the crystalline sulfide solid electrolyte obtained in Reference Example 1 gave crystallization peaks at 2θ=20.2° and 23.6° like that in Example 1 to be mentioned hereinunder, and had a thio-LISICON Region II-type crystal structure. The ionic conductivity of the crystalline sulfide solid electrolyte was measured, and was 4.1 (mS/cm).

In this Example, the ionic conductivity was measured in the following manner.

From the resultant crystalline sulfide solid electrolyte, a circular pellet having a diameter of 10 mm (cross-sectional area S: 0.785 cm$^2$) and a height (L) of 0.1 to 0.3 cm was molded to prepare a sample. From the top and the bottom of the sample, electrode terminals were taken, and the ion conductivity was measured at 25° C. according to an alternate current impedance method (frequency range: 5 MHz to 0.5 Hz, amplitude: 10 mV) to give a Cole-Cole plot. In the vicinity of the right end of the arc observed in the high-frequency side region, a real number part Z'(Ω) at the point at which −Z"(Ω) is the smallest was referred to as a bulk resistance R (Ω) of the electrolyte, and according to the following equation, the ion conductivity σ(S/cm) was calculated.

$R=\rho(L/S)$ $\sigma=1/\rho$

Reference Example 2

In a one-liter impeller-provided reaction tank, 15.3 g of lithium sulfide and 24.7 g of diphosphorus pentasulfide were added in a nitrogen atmosphere. After actuating the impeller, 400 mL of tetrahydrofuran which had been previously cooled to −20° C. was introduced into the container. After naturally raising the temperature to room temperature (23° C.), agitation was continued for 72 hours, the obtained reaction liquid slurry was charged in a glass filter (pore size: 40 to 100 μm) to obtain a solid component, and then, the solid component was dried at 90° C., thereby obtaining 38 g of Li$_3$PS$_4$ (purity: 90% by mass) as a white powder. The obtained powder was subjected to powder X-ray diffractometry (XRD) with an X-ray diffraction (XRD) apparatus (SmartLab apparatus, by Rigaku Corporation). As a result, the foregoing powder expressed a hallow pattern and confirmed to be amorphous Li$_3$PS$_4$.

Reference Example 3

The white powder of Li$_3$PS$_4$ obtained in Reference Example 2 was dried in vacuum at 180° C. for 2 hours, thereby obtaining β-Li$_3$PS$_4$ (crystalline).

Amorphous Li$_3$PS$_4$ of Reference Example 2 used as a solid electrolyte raw material, lithium sulfide, diphosphorus pentasulfide, lithium bromide and lithium iodide, and further β-Li$_3$PS$_4$ (crystalline) of Reference Example 3 were analyzed through powdery X-ray diffractometry (XRD). The X-ray diffraction spectra thereof are shown in FIG. 5.

Example 1

A crystalline sulfide solid electrolyte was produced in the same manner as in Reference Example 1, except that the complex slurry obtained by pulverization in Reference Example 1 was cooled and stored in a refrigerator (preset temperature: −5° C.) for 1 day. The resultant crystalline sulfide solid electrolyte was analyzed through powdery X-ray diffractometry (XRD) in the same manner as in Reference Example 1. The X-ray diffraction spectrum thereof is shown in FIG. 4. In addition, the ionic conductivity of the resultant crystalline sulfide solid electrolyte was measured. The measurement result is shown in Table 1.

Example 2

A crystalline sulfide solid electrolyte was produced in the same manner as in Reference Example 1, except that the complex slurry obtained by pulverization in Reference Example 1 was cooled and stored in a refrigerator (preset temperature: −5° C.) for 2 days. The ionic conductivity of the resultant crystalline sulfide solid electrolyte was measured. The measurement result is shown in Table 1.

Example 3

A crystalline sulfide solid electrolyte was produced in the same manner as in Reference Example 1, except that the complex slurry obtained by pulverization in Reference Example 1 was cooled and stored for 1 day while the temperature inside the reaction tank was kept at 10° C. by circulating a coolant through the jacket of the reaction tank. The ionic conductivity of the resultant crystalline sulfide solid electrolyte was measured. The measurement result is shown in Table 1.

Example 4

A crystalline sulfide solid electrolyte was produced in the same manner as in Reference Example 1, except that the complex slurry obtained by pulverization in Reference Example 1 was cooled and stored for 2 days while the temperature inside the reaction tank was kept at 10° C. by circulating a coolant through the jacket of the reaction tank. The ionic conductivity of the resultant crystalline sulfide solid electrolyte was measured. The measurement result is shown in Table 1.

Comparative Example 1

A crystalline sulfide solid electrolyte was produced in the same manner as in Reference Example 1, except that the complex slurry obtained by pulverization in Reference Example 1 was stored at room temperature (23° C.) for 1 day. The resultant crystalline sulfide solid electrolyte was analyzed through powdery X-ray diffractometry (XRD) in the same manner as in Reference Example 1. The X-ray diffraction spectrum thereof is shown in FIG. 4. In addition, the ionic conductivity of the resultant crystalline sulfide solid electrolyte was measured. The measurement result is shown in Table 1.

Comparative Example 2

A crystalline sulfide solid electrolyte was produced in the same manner as in Reference Example 1, except that the complex slurry obtained by pulverization in Reference Example 1 was stored at room temperature (23° C.) for 2 days. The ionic conductivity of the resultant crystalline sulfide solid electrolyte was measured. The measurement result is shown in Table 1.

TABLE 1

|  | Ionic Conductivity (mS/cm) |
| --- | --- |
| Reference Example 1 | 4.1 |
| Example 1 | 4.1 |
| Example 2 | 4.0 |
| Example 3 | 4.2 |
| Example 4 | 4.0 |
| Comparative Example 1 | 3.5 |
| Comparative Example 2 | 3.2 |

As shown in Table 1, it is confirmed that, according to the production method of the present embodiment, a sulfide solid electrolyte having a high ionic conductivity can be obtained even though the complex slurry is kept as such for a long period of time, like the sulfide solid electrolyte obtained in Reference Example in which the complex slurry was immediately dried and heated after prepared. On the other hand, it is confirmed that, in Comparative Examples 1 and 2 in which the complex slurry was, without cooled and stored, kept as such for a long period of time, the ionic conductivity significantly lowered.

From FIG. 4, it is confirmed that all the sulfide solid electrolytes obtained in Reference Example 1, Example 1 and Comparative Example 1 have crystallization peaks mainly at $2\theta=20.2°$ and $23.6°$ in the X-ray diffraction spectra thereof, and have a thio-LISICON Region II-type crystal structure.

The sulfide solid electrolyte obtained in Comparative Example 1 has a crystallization peak derived from lithium bromide at $2\theta=28.1°$ in the X-ray diffraction spectrum thereof. This is considered to be because, since the complex slurry was kept as such for a long period of time without cooled and stored, lithium bromide separated from the complex and could not be taken into the sulfide solid electrolyte, and though the resultant sulfide solid electrolyte had a thio-LISICON Region II-type crystal structure, the ionic conductivity thereof was lower than that of Reference Example 1 and Example.

INDUSTRIAL APPLICABILITY

According to the production method for a sulfide solid electrolyte of the present embodiment, a sulfide solid electrolyte having a high ionic conductivity and excellent in battery performance can be produced. The sulfide solid electrolyte obtained by the production method of the present invention is favorably used for batteries, especially for batteries for use in information-related instruments and communication instruments such as personal computers, video cameras and mobile telephones.

The invention claimed is:

1. A method for producing a sulfide solid electrolyte, comprising:
   mixing a solid electrolyte raw material and a complexing agent in a reactor to obtain a complex slurry;
   transferring the complex slurry to an intermediate tank equipped with a cooling device and cooling the complex slurry therein; and
   processing the complex slurry by at least one selected from the group consisting of drying and heating;
   wherein:
   the solid electrolyte raw material contains a lithium element, a sulfur element, a phosphorus element, and a halogen element;
   the complex slurry contains a complex formed of the solid electrolyte raw material and the complexing agent; and
   cooling the complex slurry in the intermediate tank comprises storing the complex slurry in the intermediate tank for 0.1 hours or more.

2. The method for producing a sulfide solid electrolyte according to claim 1, wherein the method further comprises pulverizing the complex, and the complex slurry contains the pulverized complex.

3. The method for producing a sulfide solid electrolyte according to claim 2, wherein the cooling is carried out after the pulverizing and before the processing.

4. The method for producing a sulfide solid electrolyte according to claim 1, wherein the cooling is carried out by keeping the complex slurry at a temperature lower than 23° C.

5. The method for producing a sulfide solid electrolyte according to claim 1, wherein the mixing comprises mixing the solid electrolyte raw material, the complexing agent, and a solvent not dissolving the complex.

6. The method for producing a sulfide solid electrolyte according to claim 5, wherein the solvent has a solubility parameter 10 or less.

7. The method for producing a solid electrolyte according to claim 1, wherein the complexing agent contains a compound having a tertiary amino group.

8. The method for producing a solid electrolyte according to claim 1, wherein the complexing agent contains an aliphatic tertiary diamine having two tertiary amino groups.

9. The method for producing a sulfide solid electrolyte according to claim 8, wherein the aliphatic tertiary diamine is at least one selected from the group consisting of tetramethylethylenediamine and tetramethyldiaminopropane.

10. The method for producing a sulfide solid electrolyte according to claim 1, wherein the solid electrolyte raw material contains lithium sulfide and diphosphorus pentasulfide.

11. The method for producing a sulfide solid electrolyte according to claim 1, wherein the solid electrolyte raw material contains amorphous $Li_3PS_4$ or crystalline $Li_3PS_4$.

12. The method for producing a sulfide solid electrolyte according to claim 1, wherein the solid electrolyte raw material contains lithium bromide.

13. The method for producing a sulfide solid electrolyte according to claim 1, wherein the sulfide solid electrolyte contains a thio-LISICON Region II-type crystal structure.

14. The method for producing a sulfide solid electrolyte according to claim 4, wherein the cooling is carried out by keeping the complex slurry at a temperature of 15° C. or lower.

15. The method for producing a sulfide solid electrolyte according to claim 1, wherein mixing the solid electrolyte raw material and the complexing agent in the reactor comprises mixing in a reactor equipped with an impeller.

16. The method for producing a sulfide solid electrolyte according to claim 1, wherein processing the complex slurry by at least one selected from the group consisting of drying and heating comprises drying with a drying device.

* * * * *